(12) United States Patent
Yamauchi

(10) Patent No.: US 11,016,613 B2
(45) Date of Patent: May 25, 2021

(54) IMAGE RECOGNITION DEVICE, IMAGE RECOGNITION METHOD AND IMAGE RECOGNITION UNIT

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 47 days.

(21) Appl. No.: 16/068,635

(22) PCT Filed: Jan. 10, 2017

(86) PCT No.: PCT/JP2017/000480
§ 371 (c)(1),
(2) Date: Jul. 6, 2018

(87) PCT Pub. No.: WO2017/122634
PCT Pub. Date: Jul. 20, 2017

(65) Prior Publication Data
US 2019/0025985 A1    Jan. 24, 2019

(30) Foreign Application Priority Data
Jan. 13, 2016  (JP) ................................ 2016-004774

(51) Int. Cl.
*G06F 3/042* (2006.01)
*G01B 11/25* (2006.01)
(Continued)

(52) U.S. Cl.
CPC ............ *G06F 3/0425* (2013.01); *G01B 11/25* (2013.01); *G03B 17/54* (2013.01); *G06F 3/042* (2013.01);
(Continued)

(58) Field of Classification Search
CPC .................. G06F 3/0425; G06F 3/042; G06F 2203/04101; H04N 9/3194; H04N 9/3129; G03B 17/54; G01B 11/25
See application file for complete search history.

(56) References Cited

U.S. PATENT DOCUMENTS

2004/0005092 A1* 1/2004 Tomasi .................. G01B 11/25
382/154
2008/0106746 A1   5/2008 Shpunt et al.
(Continued)

FOREIGN PATENT DOCUMENTS

JP      2004-077290 A     3/2004
JP      2009-511897 A     3/2009
(Continued)

OTHER PUBLICATIONS

Sato et al., "Range Picture Input System Based on Space-Encoding," 1984.
(Continued)

*Primary Examiner* — Mark W Regn
(74) *Attorney, Agent, or Firm* — Oliff PLC

(57) ABSTRACT

An image recognition device, an image recognition method and an image recognition unit capable of performing touch recognition high in accuracy. The image recognition device includes a pattern display section adapted to display a first pattern in which bright lines are arranged with a first pitch, and a second pattern in which bright lines are arranged with a second pitch at respective time points different from each other, a measurement point determination section adapted to detect a finger located between a camera and a screen, and determine a fingertip of the finger, and a position detection section adapted to detect the position of the fingertip with
(Continued)

respect to the screen based on an image including the first pattern and an image including the second pattern obtained by the camera.

12 Claims, 18 Drawing Sheets

(51) Int. Cl.
*G03B 17/54* (2021.01)
*H04N 9/31* (2006.01)

(52) U.S. Cl.
CPC ......... *H04N 9/3129* (2013.01); *H04N 9/3194* (2013.01); *G06F 2203/04101* (2013.01)

(56) References Cited

U.S. PATENT DOCUMENTS

| 2009/0096783 | A1 | 4/2009 | Shpunt et al. |
| 2010/0177164 | A1 | 7/2010 | Zalevsky et al. |
| 2011/0158508 | A1 | 6/2011 | Shpunt et al. |
| 2011/0254810 | A1 | 10/2011 | Lee et al. |
| 2012/0281240 | A1 | 11/2012 | Cohen et al. |
| 2013/0136305 | A1 | 5/2013 | Shpunt et al. |
| 2013/0155195 | A1 | 6/2013 | Zalevsky et al. |
| 2015/0054946 | A1* | 2/2015 | Zhang .................... G01B 11/25 348/136 |
| 2015/0287205 | A1 | 10/2015 | Zalevsky et al. |

FOREIGN PATENT DOCUMENTS

| JP | 2017-126192 A | 7/2017 |
| JP | 2017-126870 A | 7/2017 |
| JP | 2017-181281 A | 10/2017 |

OTHER PUBLICATIONS

Feb. 28, 2017 International Search Report issued in International Patent Application No. PCT/JP2017/000480.

* cited by examiner

IMAGE RECOGNITION DEVICE, IMAGE RECOGNITION METHOD AND IMAGE RECOGNITION UNIT

TECHNICAL FIELD

The present invention relates to an image recognition device, an image recognition method and an image recognition unit.

BACKGROUND ART

As an image recognition technology for detecting whether or not a finger has contact with a screen on which an image from a projector is projected, there is known a technology of PTL 1. In the image recognition technology of PTL 1, firstly, structured light having a lattice pattern is projected on the screen, and then a change in the lattice pattern at the position of the finger described above is recognized based on the image from an imaging device (a camera) to thereby perform touch recognition.

CITATION LIST

Patent Literature

PTL 1: US 2011/0254810

SUMMARY OF INVENTION

Technical Problem

However, in the image recognition technology described in PTL 1, the position detection accuracy in the depth direction of the finger viewed from the imaging device is low, and accordingly, there is a problem that the accuracy of the touch recognition is also low.

An object of the invention is to provide an image recognition device, an image recognition method and an image recognition unit capable of performing the touch recognition high in accuracy.

Solution to Problem

Such an object is achieved by the following aspects of the invention.

An image recognition device according to the invention is an image recognition device used in an image display unit including an imaging device adapted to image an image display surface, and a detecting image display device adapted to display a pattern for detection on the image display surface, the image recognition device including a pattern display section adapted to make the detecting image display device display a first pattern in which bright lines crossing an epipolar line determined from a positional relationship between the imaging device and the detecting image display device are arranged with a first pitch, and a second pattern in which bright lines crossing the epipolar line are arranged with a second pitch different from the first pitch at respective time points different from each other, a measurement point determination section adapted to detect an object located between the imaging device and the image display surface to determine a measurement target point of the object, and a position detection section adapted to detect a position of the measurement target point with respect to the image display surface based on an image including the measurement target point and the first pattern and an image including the measurement target point and the second pattern obtained by the imaging device.

Thus, it is possible to perform the touch recognition (determination on whether or not the object has contact with the image display surface) with high accuracy based on the detection result of the position detection section.

In the image recognition device according to the invention, it is preferable that the second pitch is shorter than twice the first pitch.

Thus, it is possible to perform the touch recognition higher in accuracy.

In the image recognition device according to the invention, it is preferable that the first pattern and the second pattern are each divided into a plurality of regions having a third pitch along an arrangement direction of the bright lines, and an address used to identify a position is assigned to each of the plurality of regions.

Thus, it is possible to detect the address in which the detection target point is located, and it is possible to display an auxiliary pattern (e.g., the third pattern described later) based on the address thus detected. Therefore, it is possible to perform the touch recognition higher in accuracy.

In the image recognition device according to the invention, it is preferable that the third pitch is equal to a lowest common multiple of the first pitch and the second pitch.

Thus, the possibility of occurrence of the phase wrapping decreases, and the touch recognition higher in accuracy becomes possible.

In the image recognition device according to the invention, it is preferable that the pattern display section makes the detecting image display device display a third pattern having a linear shape along the epipolar line passing through the measurement target point except the region in which the measurement target point is located.

Thus, it is possible to distinguish the phase wrapping using the third pattern, and the touch recognition higher in accuracy becomes possible.

In the image recognition device according to the invention, it is preferable that the pattern display section makes the detecting image display device display a third pattern straddling the region in which the measurement target point is located and two regions adjacent to the region in which the measurement target point is located.

Thus, it is possible to distinguish the phase wrapping, and the touch recognition higher in accuracy becomes possible.

In the image recognition device according to the invention, it is preferable that the pattern display section makes the detecting image display device display a third pattern having a linear pattern along a direction parallel to the epipolar line, and the linear pattern is disposed in the plurality of regions adjacent to each other so as to be shifted from each other in a direction crossing the epipolar line.

Thus, it is possible to distinguish the phase wrapping, and the touch recognition higher in accuracy becomes possible.

An image recognition method according to the invention is an image recognition method used in an image display unit including an imaging device adapted to image an image display surface, and a detecting image display device adapted to display a detecting image on the image display surface, the image recognition method including a pattern display step adapted to make the detecting image display device display a first pattern in which bright lines crossing an epipolar line determined from a positional relationship between the imaging device and the detecting image display device are arranged with a first pitch, and a second pattern in which bright lines crossing the epipolar line are arranged with a second pitch different from the first pitch at respective time points different from each other, a measurement point determination step adapted to detect an object located between the imaging device and the image display surface to determine a measurement target point of the object, and a position detection step adapted to detect a position of the measurement target point with respect to the image display surface based on an image including the measurement target point and the first pattern and an image including the measurement target point and the second pattern obtained by the imaging device.

Thus, it is possible to perform the touch recognition (determination on whether or not the object has contact with the image display surface) with high accuracy based on the detection result of the position detection section.

An image recognition unit according to the invention includes the image recognition device according to the invention, the imaging device, and the detecting image display device.

Thus, it is possible to obtain the image recognition unit capable of performing the touch recognition with high accuracy.

In the image recognition unit according to the invention, it is preferable to further include an image display device adapted to display an image on the image display surface.

Thus, it is possible to display a desired image on the image display surface.

DESCRIPTION OF EMBODIMENTS

Some preferred embodiments of the image recognition device, the image recognition method and the image recognition unit according to the invention will hereinafter be described with reference to the accompanying drawings.

First Embodiment

Firstly, an image recognition unit according to a first embodiment will be described.

Figure 1:
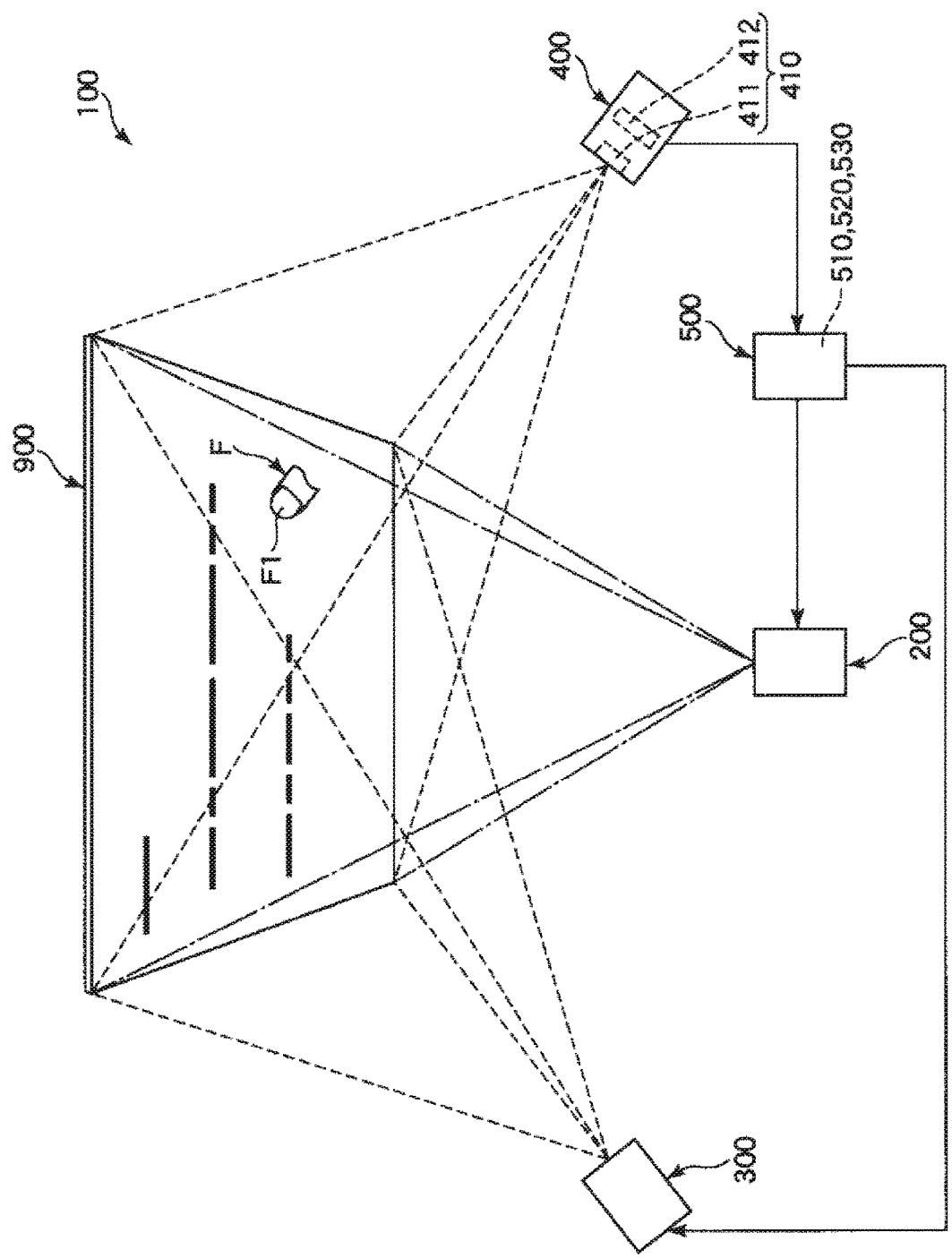
FIG. 1 is a diagram showing a configuration of an image recognition unit according to a first embodiment of the invention.
Figure 2:
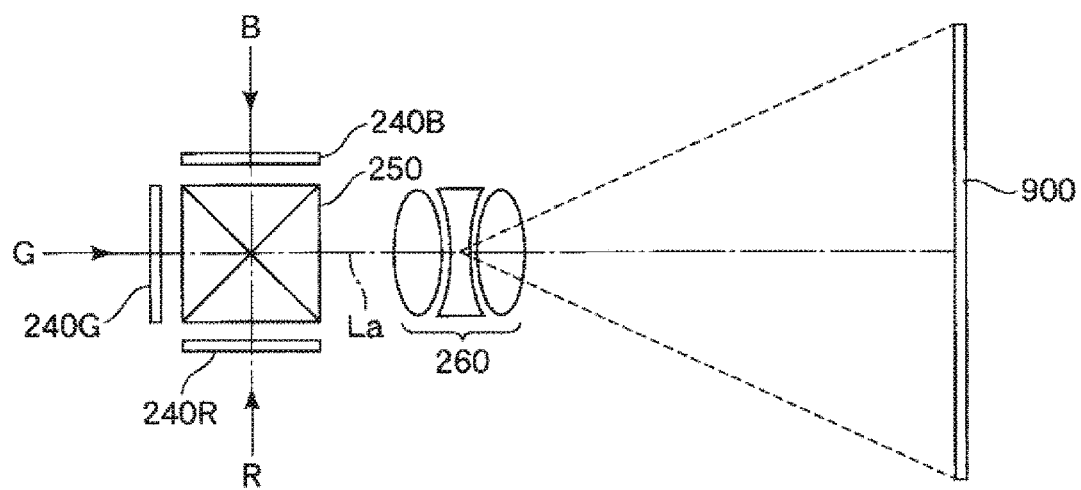
FIG. 2 is a configuration diagram of the projector shown in FIG. 1.
Figure 3:
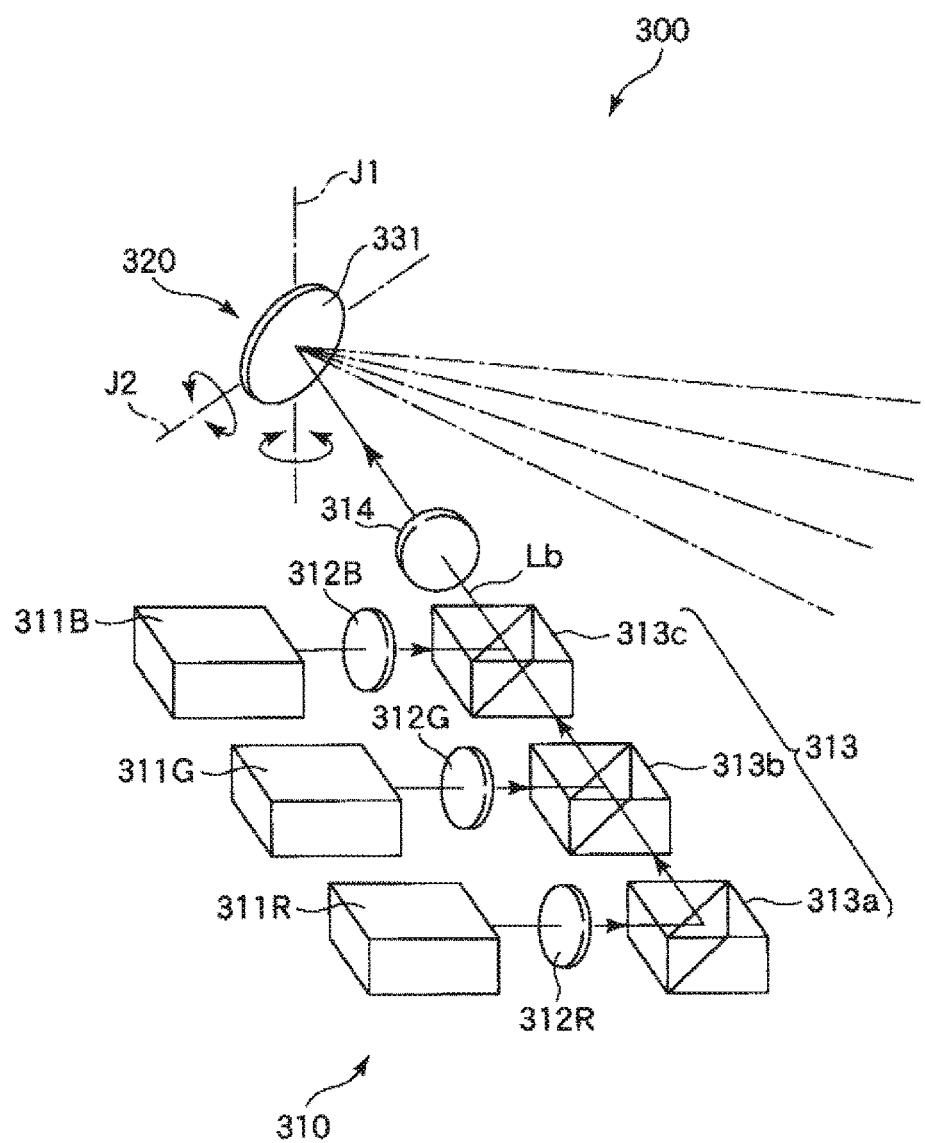
FIG. 3 is a configuration diagram of the projector shown in FIG. 1.
Figure 4:
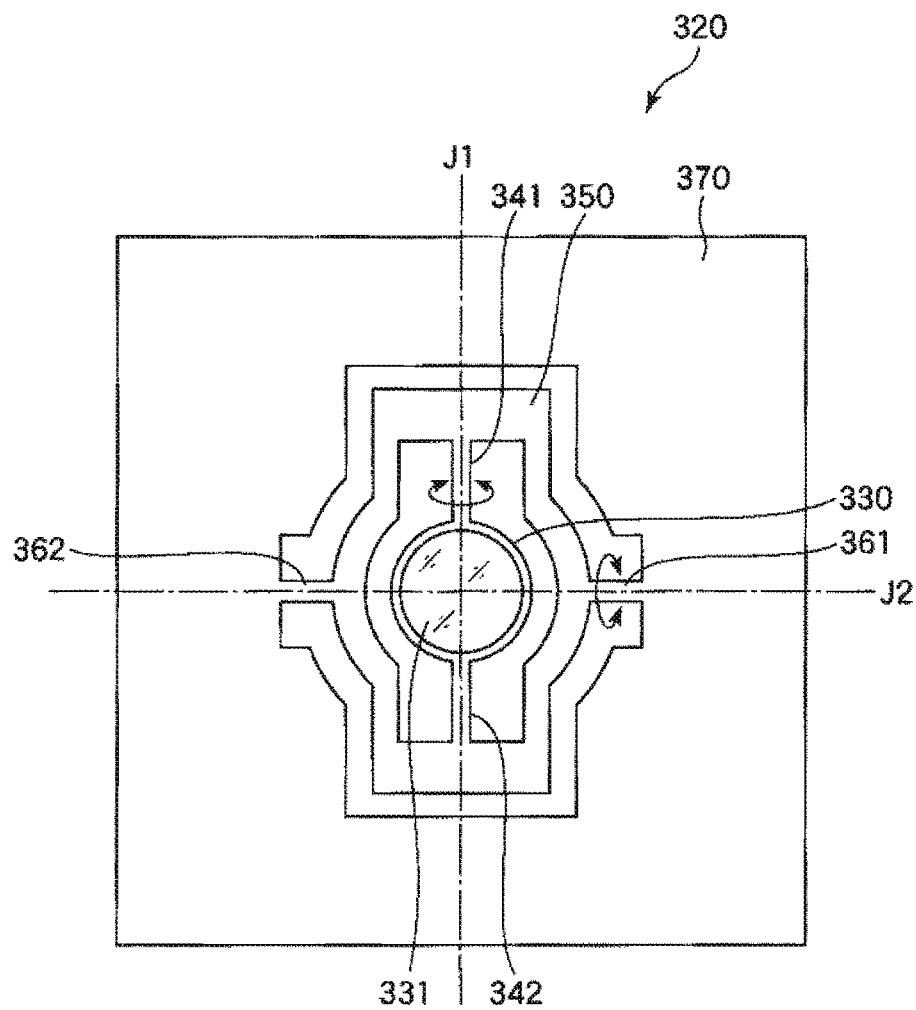
FIG. 4 is a plan view of a scanning section provided to the projector shown in FIG. 3.
Figure 5:
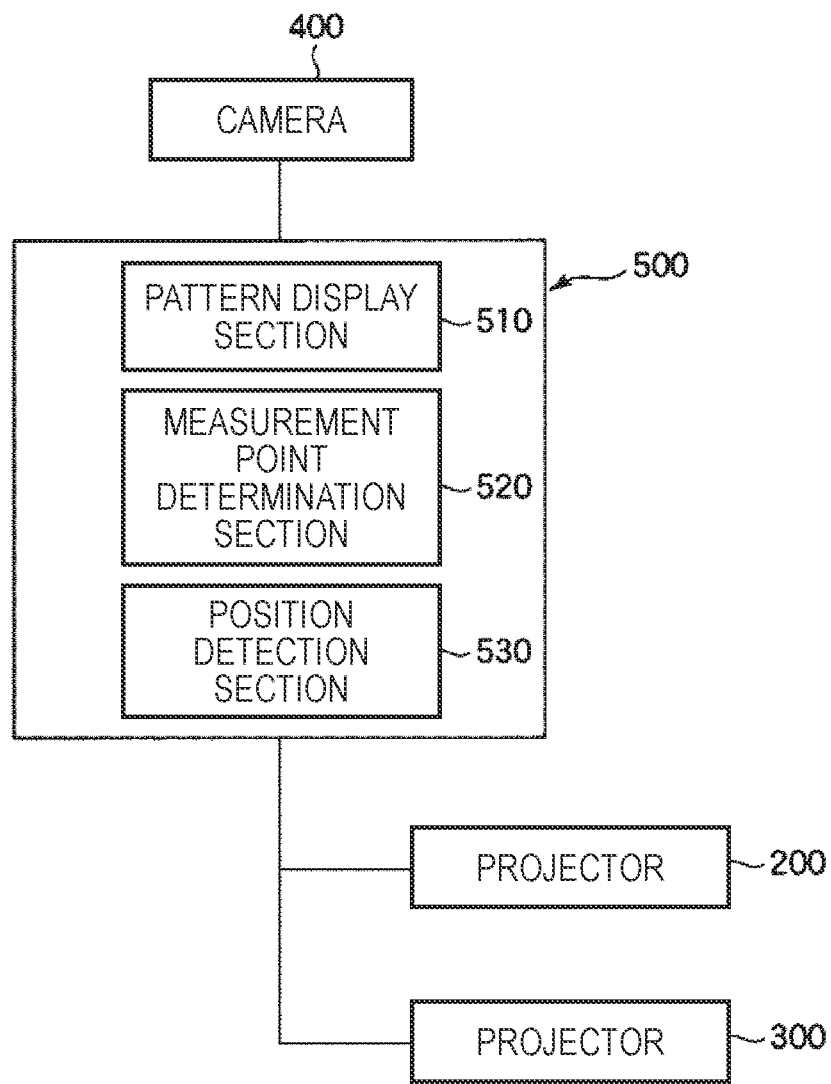
FIG. 5 is a block diagram of the image recognition device shown in FIG. 1.
Figure 6:
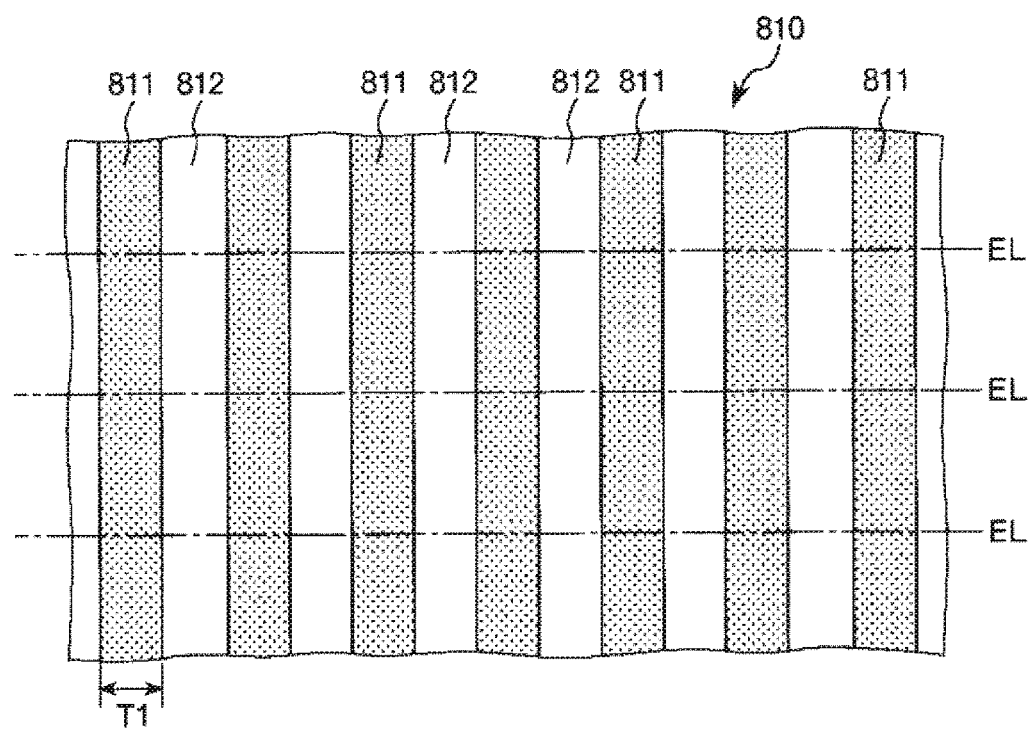
FIG. 6 is a diagram showing a first pattern and a second pattern.
Figure 6:
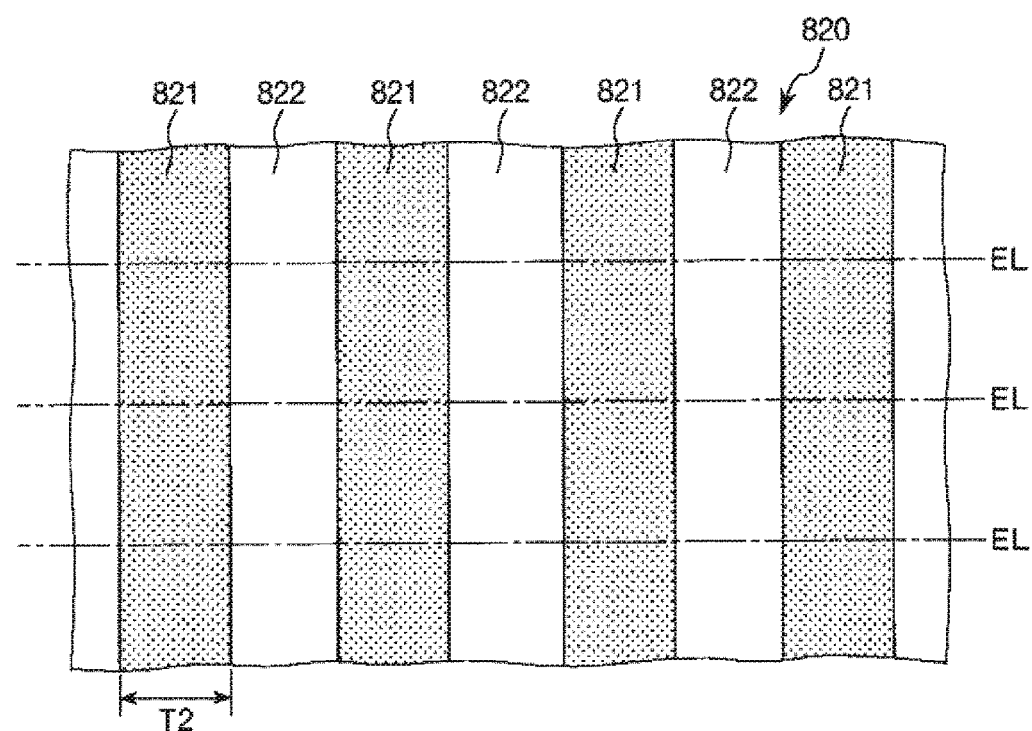
Figure 7:
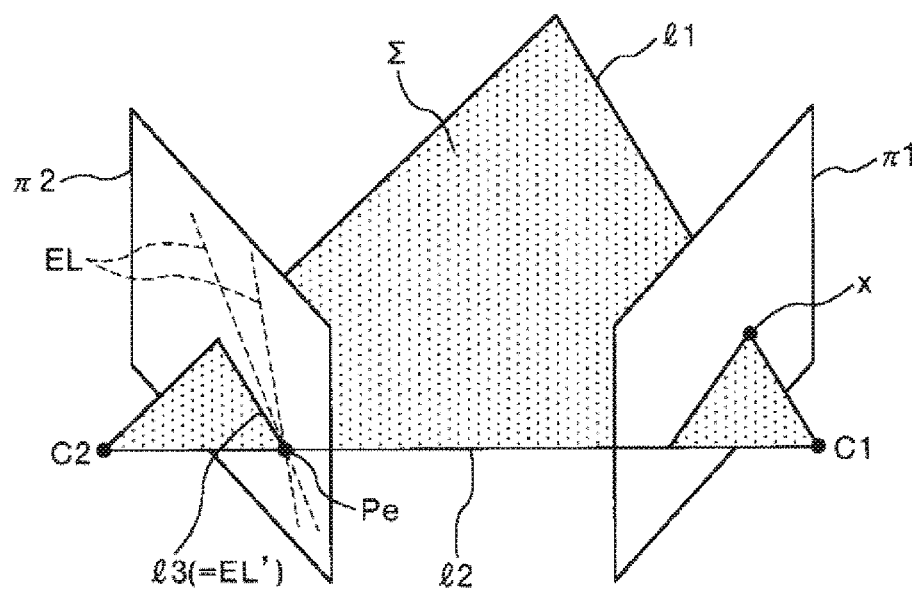
FIG. 7 is a diagram for explaining an epipolar line.
Figure 8:
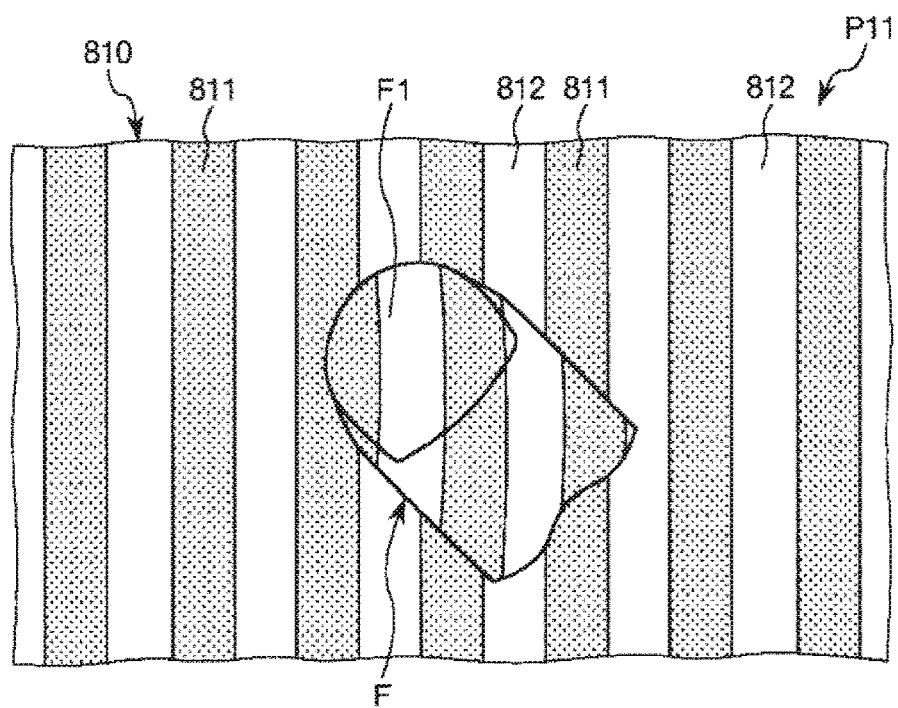
FIG. 8 is a diagram for explaining a method of touch recognition.
Figure 8:
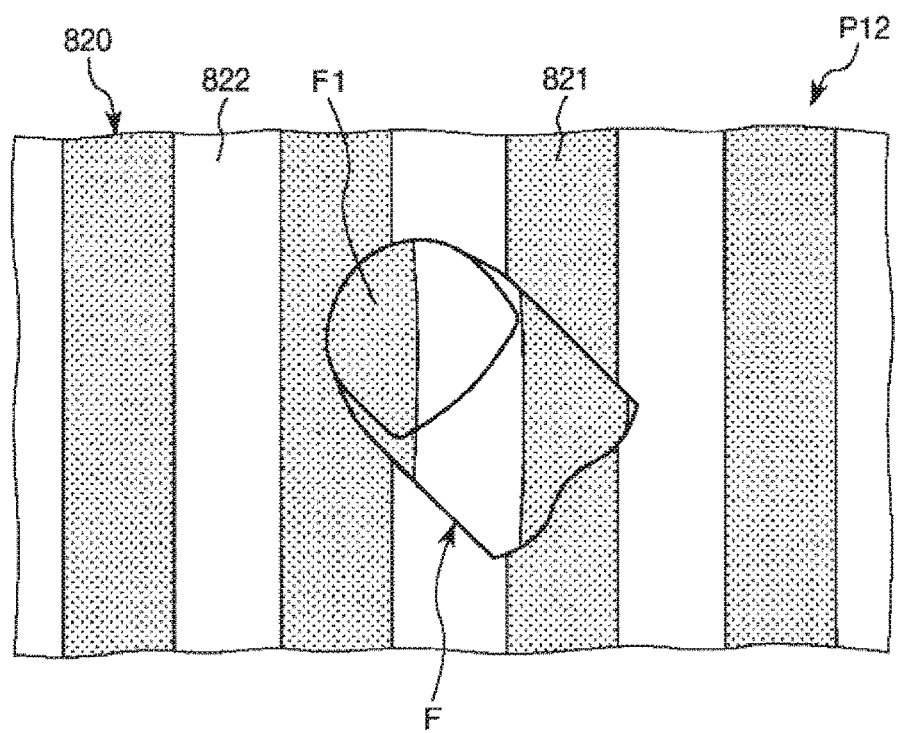
Figure 9:
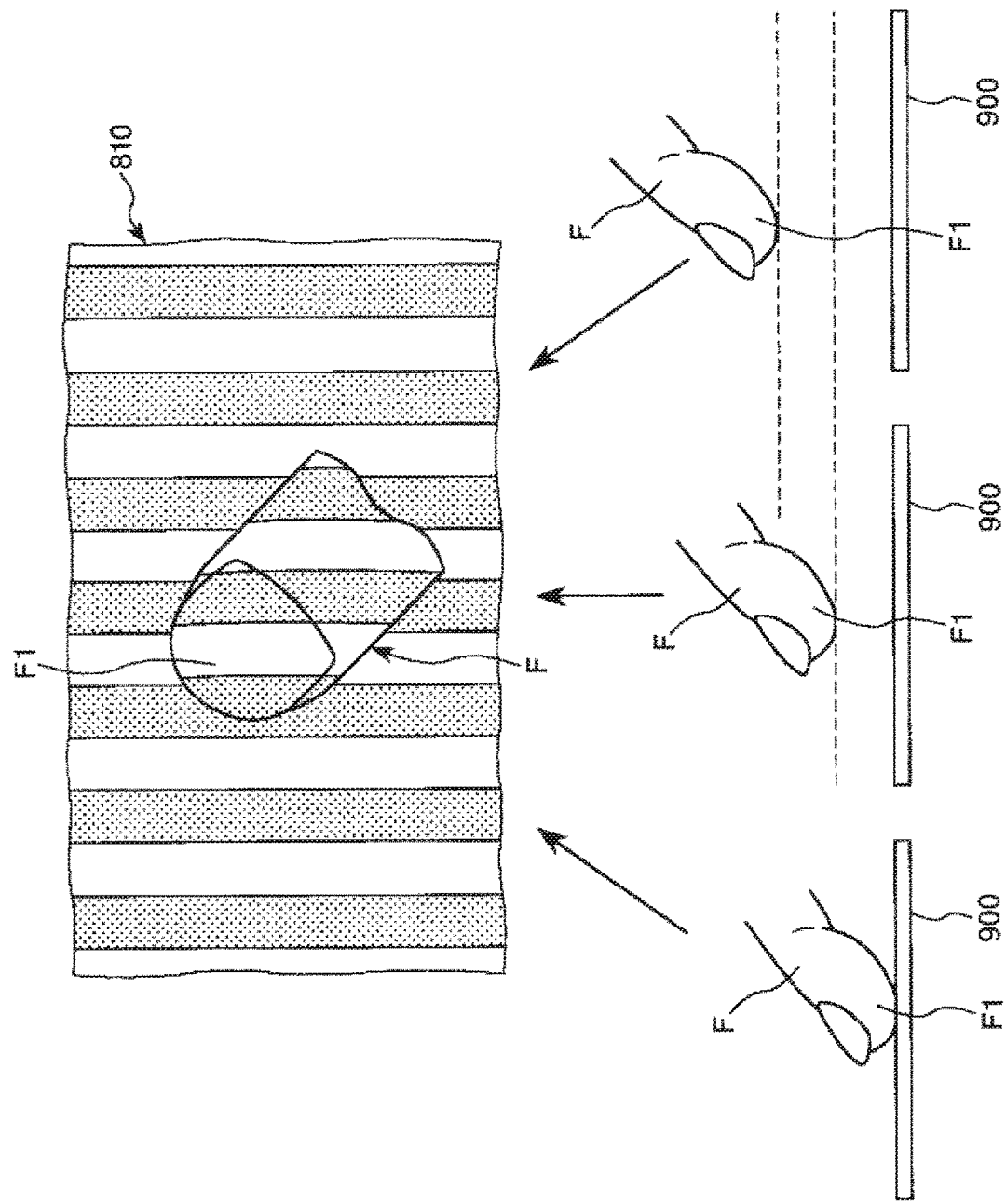
FIG. 9 is a diagram for explaining the method of the touch recognition.
Figure 10:
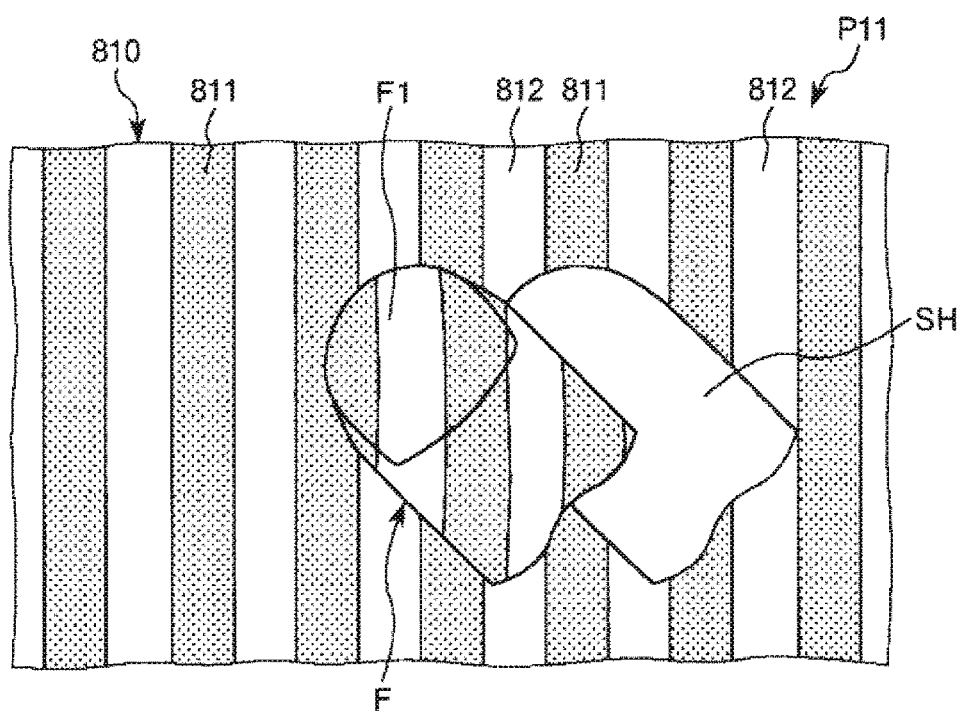
FIG. 10 is a diagram for explaining the method of the touch recognition.
Figure 10:
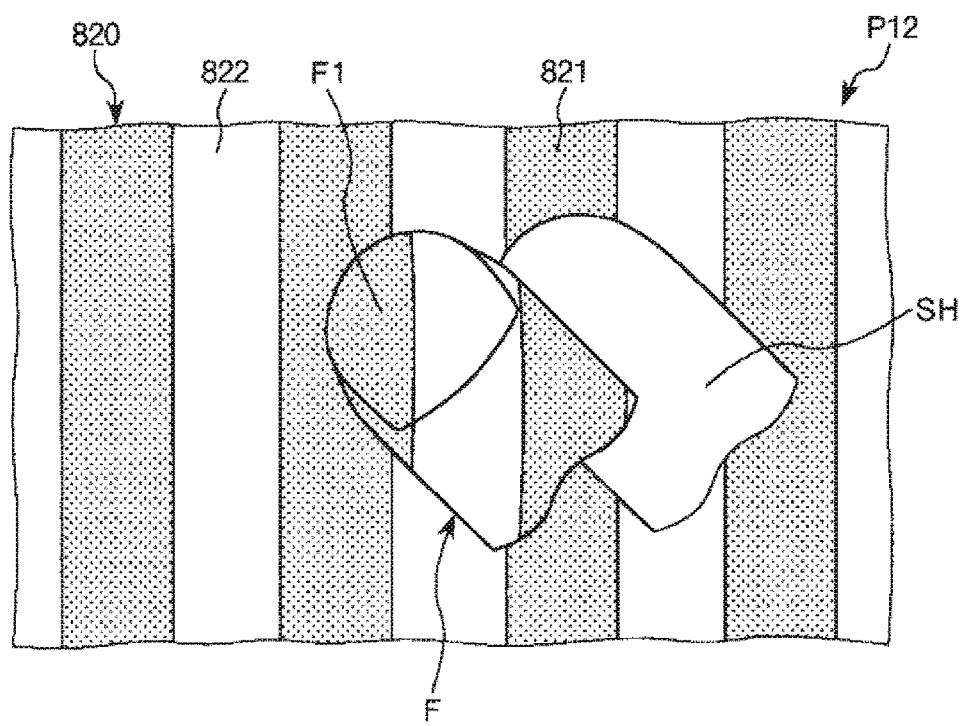

FIG. 1 is a diagram showing a configuration of the image recognition unit according to the first embodiment of the invention. FIG. 2 is a configuration diagram of the projector shown in FIG. 1. FIG. 3 is a configuration diagram of the projector shown in FIG. 1. FIG. 4 is a plan view of a scanning section provided to the projector shown in FIG. 3. FIG. 5 is a block diagram of the image recognition device shown in FIG. 1. FIG. 6 is a diagram showing a first pattern and a second pattern. FIG. 7 is a diagram for explaining an epipolar line. FIG. 8 through FIG. 10 are each a diagram for explaining a method of touch recognition.

The image recognition unit 100 shown in FIG. 1 is a device capable of determining whether or not a finger (an object) F has contact with, for example, a flat screen (an image display surface) 900, and then switching an image to be displayed on the screen 900 based on the determination result. It should be noted that the determination on whether or not the finger F has contact with the screen 900 is hereinafter referred to as "touch recognition." Such an image recognition unit 100 can be used for, for example, a presentation, and by performing the touch recognition of the finger of a presenter to switch, expand, or shrink an image to be displayed on the screen 900 as needed, it becomes possible to smoothly progress the presentation.

It should be noted that the image display surface is not limited to the screen 900, but can also be, for example, a wall or a glass. Further, the image display surface is not required to be flat, but can also be a spherical surface or an uneven surface. Further, the image display surface can change in shape with time. Further, the object on which the tough recognition is performed is not limited to the finger F, but can also be, for example, a pointer stick, or a magnet adhering to the screen 900. Further, the use application of the image recognition unit 100 is not limited to presentations, but the image recognition unit 100 can be used for a variety of applications such as a store guide of a department store, or introduction and search for a line of business.

As shown in FIG. 1, such an image recognition unit 100 has an image display unit having a projector (an image display device) 200 for displaying an image on the screen 900, a projector (detecting image display device) 300 for displaying a detecting pattern on the screen 900, and a camera (an imaging device) 400 for imaging the screen 900, and an image recognition device 500 for performing the touch recognition.

The projector 300 and the camera 400 are disposed at positions different from each other. Further, the relative (geometric) positional relationship between the projector 300 and the camera 400 is constant, and the information related to the positional relationship is stored in a storage section not shown and provided to the image recognition device 500, and is used arbitrarily.

Hereinafter, the projector 200, the projector 300, the camera 400 and the image recognition device 500 will be described in sequence.

[Projector 200]

The projector 200 is a device for displaying an image (e.g., an image for a presentation) intended to be viewed by an observer on the screen 900.

Such a projector 200 is an LCD type projector, and is provided with liquid crystal display elements 240R, 240G, 240B, a dichroic prism 250, and a projection lens system 260 as shown in FIG. 2. Then, red light R enters the liquid crystal display element 240R, green light G enters the liquid crystal display element 240G, and blue light B enters the liquid crystal display element 240B.

The liquid crystal display elements 240R, 240G, 240B are transmissive spatial light modulators corresponding respectively to the primary colors of R, G, and B, and the light beams spatially modulated by the respective liquid crystal display elements 240R, 240G, 240B are combined with each other by the dichroic prism 250, and thus full-color picture light La is emitted from the dichroic prism 250. Then, the picture light La thus emitted is enlarged and projected on the screen 900 by the projection lens system 260. Thus, an image is displayed on the screen 900.

The projector 200 is hereinabove described, but is not limited to the LCD type projector providing the projector 200 is capable of displaying an image on the screen 900, and can also be, for example, a light scanning type projector, or a DMD type projector.

[Projector 300]

The projector 300 is a device for displaying the detecting pattern for performing the touch recognition on the screen 900.

Such a projector 300 is a light scanning type projector, and is provided with a light source 310, a scanning section 320, and a projection lens system not shown as shown in FIG. 3.

The light source 310 has a light source 311R for emitting a red laser beam, a light source 311G for emitting a green laser beam, a light source 311B for emitting a blue laser beam, collimator lenses 312R, 312G, 312B for respectively collimating the light beams emitted from the light sources 311R, 311G, 311B, a light combining section 313, and a collecting lens 314.

The light combining section 313 is an element for combining the laser beams from the light sources 311R, 311G, 311B with each other to generate the modulated light Lb, and has three dichroic mirrors 313a, 313b, 313c. Further, the modulated light Lb generated by the light combining section 313 is changed to have a desired NA (numerical aperture) by the collecting lens 314, and is then guided to the scanning section 320.

The scanning section 320 is an optical scanner capable of oscillating around two axes, and has a movable section 330 having a mirror 331, shaft sections 341, 342 for supporting the movable section 330 so as to be able to oscillate around an axis J1, a drive frame section 350 for supporting the shaft sections 341, 342, shaft sections 361, 362 for supporting the drive frame section 350 so as to be able to oscillate around an axis J2 perpendicular to the axis J1, and a support section 370 having a frame-like shape for supporting the shaft sections 361, 362 as shown in FIG. 4. In such a scanning section 320, by oscillating the movable section 330 around the axis J1 with respect to the drive frame section 350 while oscillating the drive frame section 350 around the axis J2 with respect to the support section 370 using a driver not shown, it is possible to perform two-dimensional scan with the modulated light Lb reflected by the mirror 331.

Then, the modulated light Lb with which the scan is performed by the scanning section 320 is enlarged and projected on the screen 900 by the projection lens system not shown. Thus, the detecting pattern is displayed on the screen 900.

The projector 300 is hereinabove described, but is not limited to the light scanning type projector providing the projector 300 is capable of displaying the detecting pattern on the screen 900, and can also be, for example, the LCD type projector or a DMD type projector. Further, even in the case of the light scanning type projector, the configuration described above is not a limitation, and it is also possible to perform two-dimensional scan with the modulated light Lb using, for example, two single-axis oscillation type optical scanners. Further, it is also possible for the projector 300 to have a configuration of projecting two types of fixed patterns different from each other using a diffractive optical element and a laser light source.

[Camera 400]

The camera 400 is a device for imaging the screen 900. Such a camera 400 is, for example, an RGB camera, and has a light receiving unit 410 provided with a lens system 411 and an imaging element 412, and a processing section not shown for processing a video signal from the imaging element 412 as shown in FIG. 1.

[Image Recognition Device]

The image recognition device 500 is a device for performing the touch recognition using the projector 300 and the camera 400 described above.

As shown in FIG. 5, such an image recognition device 500 has a pattern display section 510, a measurement point determination section 520, and a position detection section 530.

The pattern display section 510 makes the projector 300 display the detecting pattern on the screen 900 (a pattern display step). As shown in FIG. 6, the detecting pattern has a first pattern 810 and a second pattern 820, and the first pattern 810 and the second pattern 820 are alternately projected on the screen 900. In other words, the first pattern 810 and the second pattern 820 are not simultaneously displayed, but are displayed at respective time points different from each other (displayed in a time-sharing manner).

Here, an epipolar line EL related to the first and second patterns 810, 820 will briefly be described. The epipolar line EL is a line determined by a geometric (relative) positional relationship between the projector 300 and the camera 400. Specifically, as shown in FIG. 7, an intersection point between a straight line (base line) l2 connecting the camera center (principal point of the lens system 411) C1 of the camera 400 and the angle alteration center (the center of the mirror 331) C2 when performing the scan with the modulated light Lb of the scanning section 320, and a virtual image plane π2 of the projector 300 is referred to as an epipolar point Pe, and all of the straight lines passing through the epipolar point Pe in the virtual image plane π2 are referred to as epipolar lines EL.

Further, as shown in FIG. 7, if the fingertip F1 is included in the image of the camera 400, the coordinate (in-plane coordinate) x of the fingertip F1 in an image plane π1 of the camera 400 is determined. The plane defined by the straight line 11 passing through the coordinate x and the camera center C1, and the straight line 12 is referred to as an epipolar plane Σ. Further, in the case of defining the epipolar line EL coinciding with a straight line 13, which is obtained by the epipolar plane Σ and the virtual image plane π2 intersecting with each other, as the "epipolar line EL'," the fingertip F1 is located somewhere on the epipolar line EL' as a result.

It should be noted that FIG. 6 shows an image obtained by performing a stereo-collimating process (an epipolar line horizontalizing process) on the image obtained by the camera 400. Therefore, all of the epipolar lines EL become roughly parallel to each other, and become in the state of extending in a horizontal direction (the lateral direction in the sheet).

The first pattern 810 is a pattern in which bright lines extending in a direction (a vertical direction) roughly perpendicular to the epipolar lines EL are arranged with a first pitch T1 as in the stereo-rectified image shown in FIG. 6. Specifically, the first pattern 810 is a pattern having first regions 811 having a predetermined luminance, and second regions 812 having a different luminance from that of the first regions 811 alternately arranged to have the same width T1. It is preferable for the luminance of the first regions 811 and the luminance of the second regions 812 to be set so that the contrast ratio becomes as high as possible.

On the other hand, the second pattern 820 is a pattern in which bright lines extending in a direction (a vertical direction) roughly perpendicular to the epipolar lines EL are arranged with a second pitch T2 different from the first pitch T1 as in the stereo-rectified image shown in FIG. 6. Specifically, the second pattern 820 is a pattern having first regions 821 having a predetermined luminance, and second regions 822 having a different luminance from that of the first regions 821 alternately arranged to have the same width T2. It is preferable for the luminance of the first regions 821 and the luminance of the second regions 822 to be set so that the contrast ratio becomes as high as possible.

Here, the second pitch T2 is not particularly limited, but is preferably shorter than twice the first pitch T1. If the second pitch T2 is set equal to or longer than twice the first pitch T1, it results that two or more pitches of the first pattern 810 are included in one pitch T2 of the second pattern 820. Therefore, depending on the usage environment, there is a possibility that the accuracy of the depth analysis of the fingertip F1 described later is deteriorated. It should be noted that in the present embodiment, the second pitch T2 is made 1.75 time the first pitch T1. The reason therefor will be described later.

The first and second patterns 810, 820 are hereinabove described, but the first and second patterns 810, 820 are not limited to the configuration described above. For example, the first regions 811, 821 and the second regions 812, 822 can also be tilted with respect to the epipolar line EL, or curved to have a meandering shape, or a circular arc shape.

The measurement point determination section 520 detects the finger F located between the camera 400 and the screen 900 from the image obtained by the camera 400, and further, determines the fingertip F1 of the finger F as a measurement target point (a measurement point determination step).

As the determination method of the fingertip F1, for example, the image of the screen 900 on which the first pattern 810 is projected is firstly obtained by the camera 400, and then an image obtained by stereo-collimating the image is stored as a first pattern reference image. Then, it is possible to extract the contour of the finger F from a difference between the stereo-rectified image in which the fingertip F1 is reflected together with the first pattern 810 and the first pattern reference image, then detect a part having a similar contour shape to the fingertip F1 from the contour shape of the finger F thus extracted, and then determine the part thus detected as the fingertip F1.

It should be noted that the determination method of the fingertip is not limited to the above. For example, it is also possible to obtain the image of the screen 900 on which the second pattern 820 is projected by the camera 400 instead of the first pattern reference image, and then extract the contour of the finger F from the difference between the stereo-rectified image in which the fingertip F1 is reflected together with the second pattern 820 and a second pattern reference image obtained by stereo-collimating the image described above using the second pattern reference image. Further, it is also possible to use the first pattern reference image and the second pattern reference image together with each other.

Further, for example, it is also possible to extract a flesh-color-like area (an area having a color similar to the color of the finger F) using the HSV color system from the image obtained by the camera 400, and further, detect a part having a similar contour shape to the fingertip F1 from the contour shape of the flesh-color-like area thus extracted to determine the part thus detected as the fingertip F1.

The position detection section 530 detects the depth (position) of the fingertip F1 based on the first pattern 810 and the second pattern 820 reflected in the image obtained by the camera 400, and performs the touch recognition based on the detection result (a position detection step).

Specifically, firstly, as shown in FIG. 8, the position detection section 530 obtains the image of the screen 900 in the state in which the first pattern 810 is projected using the camera 400, then stereo-collimating this image to obtain a first image P11, and at the same time, obtains the image of the screen 900 in the state in which the second pattern 820 is projected using the camera 400, and then stereo-collimating this image to obtain a second image P12. In the first image P11 obtained in such a manner, between the first pattern 810 on the screen 900 and the first pattern 810 on the fingertip F1, there occurs the pitch fluctuation (pattern shift) based on the depth of the fingertip F1. The same applies to the second image P12.

It should be noted that it is preferable for the camera 400 to obtain these images in the shortest possible period of time (e.g., within 1/120 second). Thus, it is possible to reduce the difference in position between the fingertip F1 in the first image P11 and the fingertip F1 in the second image P12, and thus, the touch recognition high in accuracy becomes possible.

Then, the position detection section 530 performs the depth analysis of the first pattern 810 reflected on the screen 900 using the first image P11 to detect (estimate) the depth at the position overlapping the fingertip F1 of the screen 900, and at the same time, performs the depth analysis of the first pattern 810 reflected on the fingertip F1 to detect the depth of the fingertip F1. At the same time, the position detection section 530 performs the depth analysis of the second pattern 820 reflected on the screen 900 using the second image P12 to detect (estimate) the depth at the position overlapping the fingertip F1 of the screen 900, and at the same time, performs the depth analysis of the second pattern 820 reflected on the fingertip F1 to detect the depth of the fingertip F1.

As a result of such detection as described above, if the depth of the fingertip F1 does not coincide with the depth of the screen 900 in at least one of the first image P11 and the second image P12, the position detection section 530 determines a "non-contact state" in which the fingertip F1 does not have contact with the screen 900. In contrast, in the case in which the depth of the fingertip F1 coincides with the depth of the screen 900 in both of the first image P11 and the second image P12, the position detection section 530 further performs the following determination.

For example, in the description of the first image P11, as shown in FIG. 9, even if the fingertip F1 is separated from the screen 900, in the case in which the way of the separation causes the pitch fluctuation (pattern shift) corresponding to an integral multiple of the pitch of the first pattern 810, there is obtained the same image of the pattern on the fingertip F1 as that in the contact state in which the fingertip F1 has contact with the screen 900 despite the non-contact state (hereinafter this phenomenon is referred to as "phase wrapping"). The same applies to the second image P12.

Therefore, in the case in which the way of the separation of the fingertip F1 causes the pitch fluctuation corresponding to an integral multiple of the pitch of the first pattern 810, and at the same time causes the pitch fluctuation corresponding to an integral multiple of the pitch of the second pattern 820, the phase wrapping occurs. Therefore, it is necessary to distinguish between the contact state and the state in which the phase wrapping occurs. It should be noted that, as described above, the pitch (the second pitch T2) of the second pattern 820 is 1.75 time the pitch (the first pitch T1) of the first pattern 810. By adopting such a relationship, it is possible to make the lowest common multiple of the both pitches relatively large (7 time the first pitch T1, 4 time the second pitch T2), and therefore, it is possible to make the condition for causing the phase wrapping lower.

The method of distinguishing between the contact state and the state in which the phase wrapping occurs is not particularly limited, but the following method can be cited. That is, since in the first and second images P11, P12 in the case of the contact state, the fingertip F1 has contact with the screen 900, the shadow of the fingertip F1 does not occur on the screen 900 as shown in FIG. 9. In contrast, since in the first and second images P11, P12 in the case in which the phase wrapping occurs, the fingertip F1 is separated from the screen 900, the shadow SH of the fingertip F1 occurs on the screen 900 as shown in FIG. 10. Therefore, it is possible for the position detection section 530 to determine the "contact state" if the shadow of the fingertip F1 does not occur in the screen 900 in the first and second images P11, P12, and determine the "phase wrapping state" in which the phase wrapping occurs if the shadow occurs.

It should be noted that depending on the arrangement of the projector 300 and the camera 400, the shape and the size (the individual difference) of the fingertip F1 and so on, the shadow occurs on the screen 900 despite the contact state in some cases. Therefore, it is also possible to set a threshold value for the width (size) of the shadow, and determine the "contact state" if the width of the shadow is smaller than the threshold value, and determine the "phase wrapping state" if the width of the shadow is equal to or larger than the threshold value.

In the case in which the determination result is the "contact state," the position detection section 530 transmits the determination result to a control section not shown. The control section having received the determination result transmits a screen operation commend determined in accordance with the contact position of the fingertip F1 such as a command for expanding or contracting the image displayed on the screen 900, or a command for switching the image to the projector 200. By performing such control, it is possible to operate the image displayed on the screen 900 only by touching the screen 900 with the fingertip F1, and therefore, the image recognition unit 100 high in convenience is obtained.

As described above, it is the procedure (method) of the touch recognition by the image recognition device 500 to perform the pattern display step, the measurement point determination step, and the position detection step, and by repeatedly performing the procedure with a predetermined period, it is possible to repeatedly perform the touch recognition.

According to such an image recognition device 500, the calculation load can be reduced, and at the same time, the touch recognition high in accuracy becomes possible. Further, the epipolar line EL is a line which can be obtained in accordance with the geometric positions of the projector 300 and the camera 400 irrespective of the three-dimensional position and the surface shape of the screen 900. Therefore, once the geometric positions of the projector 300 and the camera 400 are set, it is possible to perform the touch recognition without being affected by the position and the shape of the screen 900. In particular, as described above, since the occurrence of the phase wrapping is reduced by using the first and second patterns 810, 820, it is possible to perform the touch recognition high in accuracy. Conversely, it can be said that the pitches of the first and second patterns 810, 820 can be shortened accordingly to the reduction of the occurrence of the phase wrapping, and accordingly, the touch recognition higher in accuracy becomes possible.

Second Embodiment

Then, an image recognition unit according to a second embodiment of the invention will be described.

Figure 11:
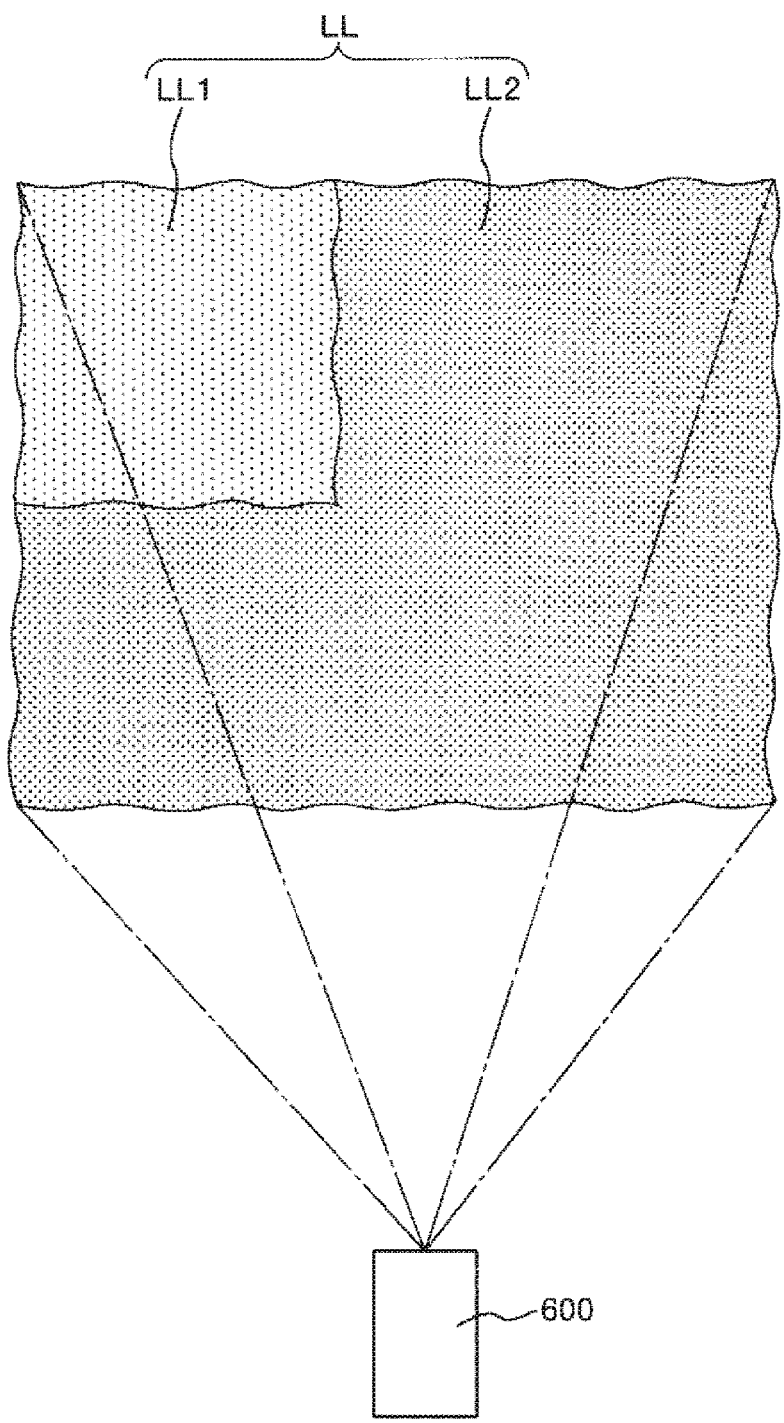
FIG. 11 is a diagram showing illumination light used in an image recognition unit according to a second embodiment of the invention.
Figure 12:
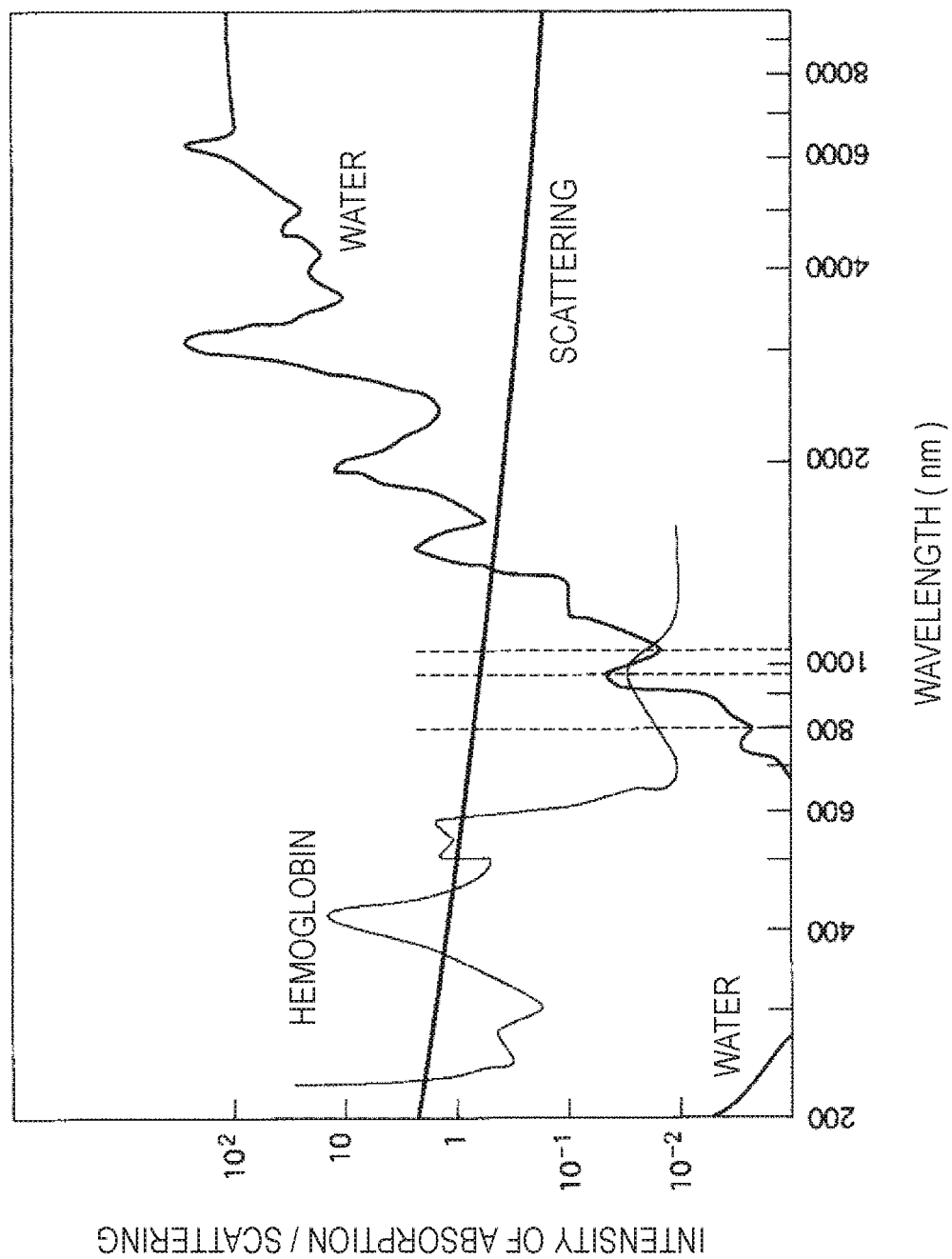
FIG. 12 is a graph showing a wavelength absorption characteristic of a substance constituting a finger.

FIG. 11 is a diagram showing illumination light used in the image recognition unit according to the second embodiment of the invention. FIG. 12 is a graph showing the wavelength absorption characteristic of a substance constituting the finger.

Hereinafter, the image recognition unit according to the second embodiment of the invention will be described wherein the description will be presented with a focus mainly on the differences from the embodiment described above, and the description regarding substantially the same matters will be omitted.

The image recognition unit according to the second embodiment is substantially the same mainly as the first embodiment described above except the point that the extraction method of the finger is different. It should be noted that the constituents substantially the same as those of the embodiment described above are denoted by the same reference symbols.

In the first embodiment described above, since it is necessary to use the first pattern reference image and the second pattern reference image for the extraction of the finger F, in the case in which, for example, the position of the screen 900 changes, or the case in which the shape of the screen 900 changes (in other words, in the case in which the background of the finger F changes), it is necessary to obtain the first and second pattern reference images once again in each case, and there is a possibility that the extraction of the finger F cannot smoothly be achieved. In other words, the first embodiment described above exerts the particularly excellent advantage in the case in which the position and the shape of the screen 900 are fixed. In contrast, in the present embodiment described below, since the first pattern reference image and the second pattern reference image are not required, it is possible to smoothly extract the finger F even in the case in which the position of the screen 900 changes, or the case in which the shape of the screen 900 changes.

The image recognition unit 100 according to the present embodiment further has a projector (an illumination light irradiation device) 600 for irradiating the screen 900 with illumination light LL as shown in FIG. 11 in addition to the projector 200, the projector 300, the camera 400, and the image recognition device 500. The projector 600 irradiates the screen 900 with the illumination light LL as NIR light (near infrared light having the wavelength of about 800 through 2500 nm) so that the illumination light LL spreads in the entire area of the screen 900. Such illumination light LL is used for the extraction of the finger F.

The configuration of the projector 600 is not particularly limited providing the irradiation with the illumination light LL can be performed. For example, a liquid crystal type projector, a light scanning type projector, and a DMD type projector can be used. Further, it is also possible for the projector 200 or the projector 300 to also function as the projector 600.

As shown in FIG. 11, the illumination light LL of the present embodiment includes first illumination light LL1 having a first wavelength, and second illumination light LL2 having a second wavelength different from the first wavelength, and it is arranged that the screen 900 is irradiated with the first illumination light LL1 and the second illumination light LL2 at the same time. It should be noted that it is also possible for the first illumination light LL1 and the second illumination light LL2 to be emitted alternately in a time-sharing manner. Further, the first illumination light LL1 and the second illumination light LL2 are both solid light having no pattern, and are arranged to uniformly (evenly) illuminate the screen 900.

Further, the first illumination light LL1 and the second illumination light LL2 are both the NIR light, and at the same time different in wavelength absorption characteristic by the finger F from each other. FIG. 12 is a graph showing the wavelength absorption characteristic of a substance constituting the finger F. As shown in the drawing, for example, the light absorption by water and hemoglobin is low around 800 nm and around 1050 nm compared to that in the surrounding wavelengths on the one hand, the light absorption by water and hemoglobin is high around 970 nm compared to that in the surrounding wavelengths on the other hand. Therefore, in the present embodiment, the wavelength of the first illumination light LL1 is set to 800 nm, and the wavelength of the second illumination light LL2 is set to 970 nm. It should be noted that the wavelengths of the first and second illumination light LL1, LL2 are not particularly limited providing the wavelength absorption characteristics are different from each other, and can arbitrarily be set in accordance with the composition of the object.

Further, the camera 400 is a 2-band camera capable of obtaining the image by the first illumination light LL1 and the image by the second illumination light LL2 at the same time. Since the difference occurs between the image by the first illumination light LL1 and the image by the second illumination light LL2 due to the difference in wavelength absorption characteristic described above, it is possible for the measurement point determination section 520 to perform the extraction of the finger F by comparing these images with each other. Such a method is known to the public as "multispectral sensing," "hyperspectral sensing," and so on.

According to such a configuration, since the first pattern reference image and the second pattern reference image as in the first embodiment described above are unnecessary, it is possible to smoothly extract the finger F even in the case in which the position of the screen 900 changes, or the case in which the shape of the screen 900 changes.

According also to such a second embodiment as described hereinabove, substantially the same advantages as in the first embodiment described above can be exerted.

Third Embodiment

Then, an image recognition unit according to a third embodiment of the invention will be described.

Figure 13:
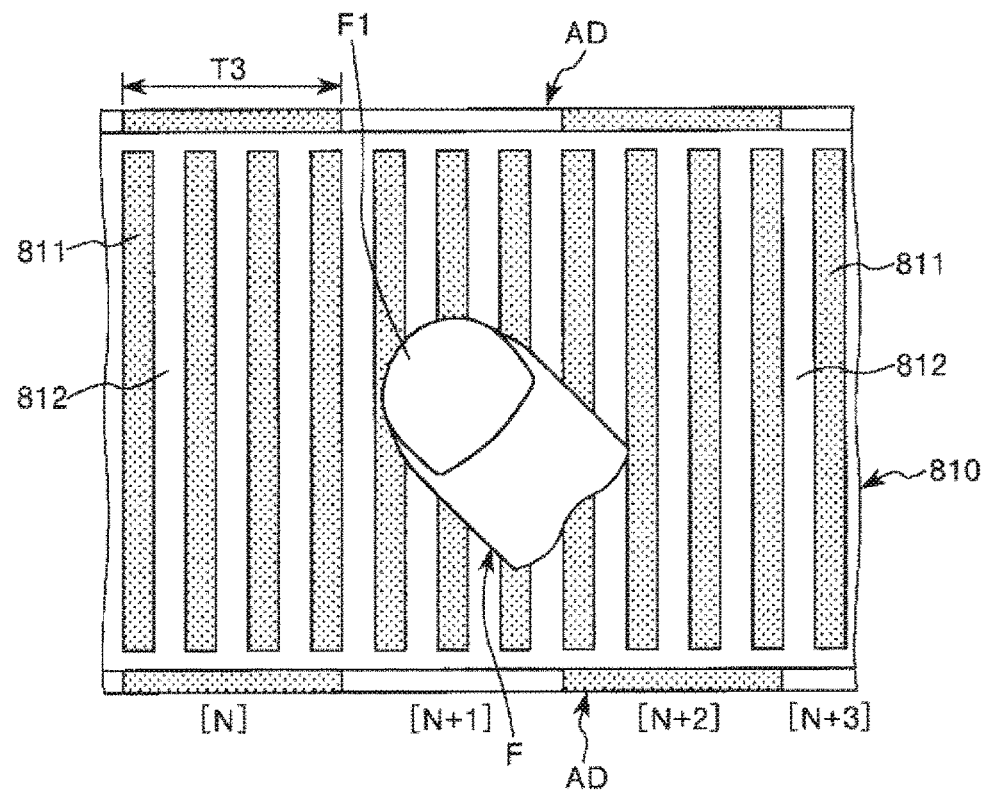
FIG. 13 is a diagram showing a detecting pattern used in an image recognition unit according to a third embodiment of the invention.
Figure 13:
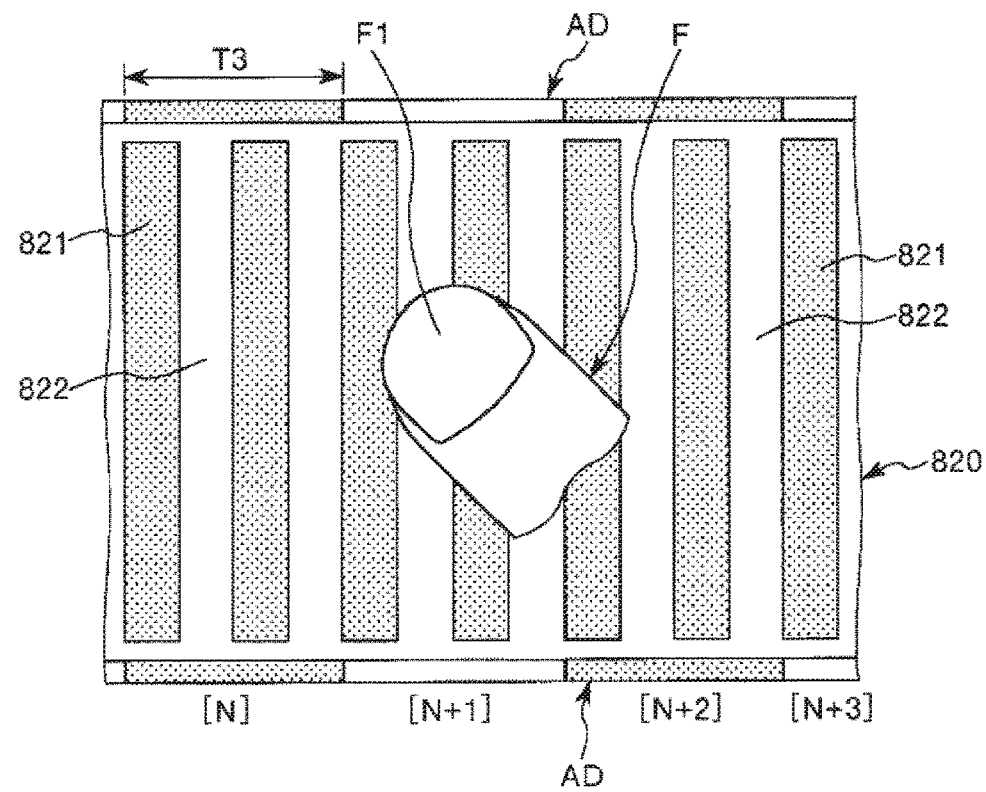
Figure 14:
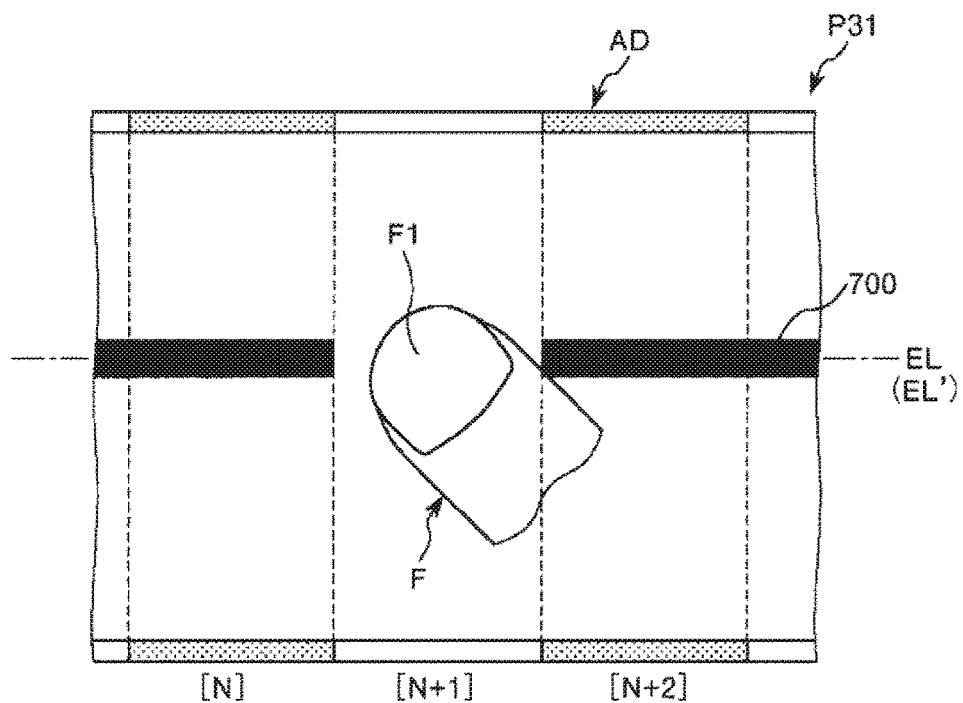
FIG. 14 is a diagram for explaining a method of the touch recognition.
Figure 15:
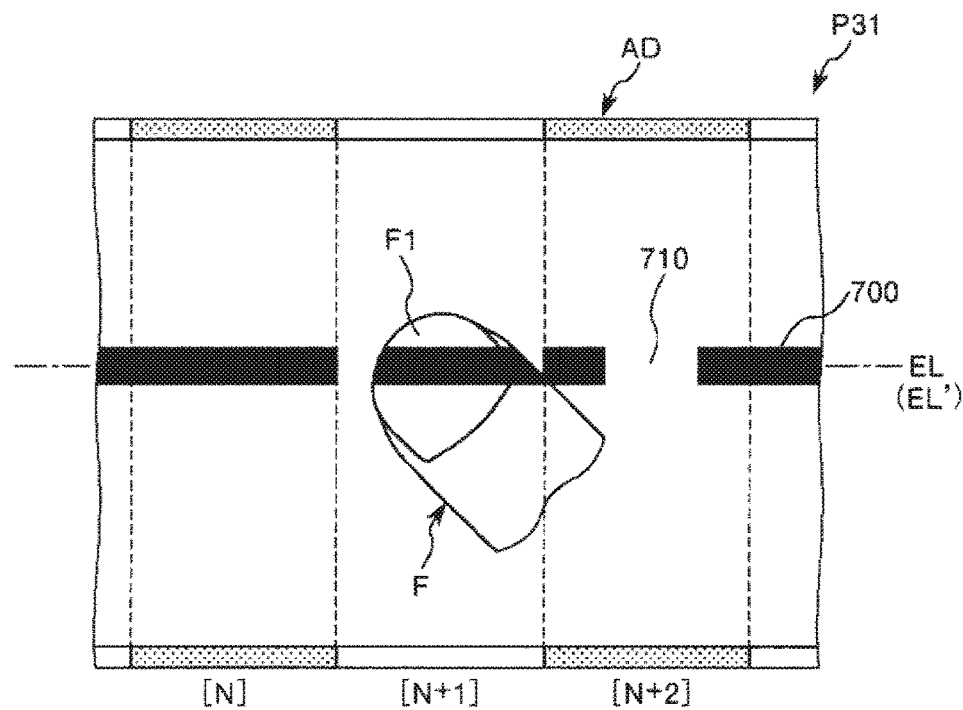
FIG. 15 is a diagram for explaining the method of the touch recognition.

FIG. 13 is a diagram showing a detecting pattern used in the image recognition unit according to the third embodiment of the invention. FIG. 14 and FIG. 15 are each a diagram for explaining a method of the touch recognition. It should be noted that in FIG. 14 and FIG. 15, illustration of the first and second patterns projected on the finger is omitted for the sake of convenience of explanation.

Hereinafter, the image recognition unit according to the third embodiment of the invention will be described wherein the description will be presented with a focus mainly on the differences from the embodiment described above, and the description regarding substantially the same matters will be omitted.

The image recognition unit according to the third embodiment is substantially the same as the first embodiment described above except the point that the configuration of the detecting pattern is different. It should be noted that the constituents substantially the same as those of the embodiment described above are denoted by the same reference symbols.

As shown in FIG. 13, in the present embodiment, an address pattern AD is additionally used as the detecting pattern. The address pattern AD has a function of dividing each of the first and second patterns 810, 820 into a plurality of regions having a third pitch T3, and assigning an address (information for identifying the position) to each of the regions obtained by the division.

Specifically, the address pattern AD is formed of a pattern having the third pitch corresponding to the lowest common multiple (7 time the pitch of the first pattern 810, 4 time the pitch of the second pattern 820) of those of the first and second patterns 810, 820, and is displayed on the upper side and the lower side of each of the first and second patterns 810, 820. In other words, the first pattern 810 is divided by the address pattern AD so that one region is formed every 7 pitches, and it is arranged that the position can be identified region by region. Similarly, the second pattern 820 is divided by the address pattern AD so that one region is formed every 4 pitches, and it is arranged that the position can be identified region by region. It should be noted that the width of one address is set slightly larger than the width of the fingertip F1.

It should be noted that the configuration of the address pattern AD is not particularly limited providing substantially the same advantages as described above can be exerted. For example, it is also possible for the address pattern AD to be displayed on at least one of the upper side and the lower side of each of the first and second patterns 810, 820.

Further, in the present embodiment, a third pattern 700 is additionally used as the detecting pattern. The third pattern 700 is emitted from the projector 300 together with the first and second patterns 810, 820.

The third pattern 700 is a linear pattern extending on the epipolar line EL (EL') passing through the fingertip F1. Further, the third pattern 700 is projected so as to exclude the address [N+1] in which the fingertip F1 is located, and include the addresses [N], [N+2] adjacent on both sides to the address [N+1]. It should be noted that the third pattern 700 can be generated using the visible light, or can also be generated using the NIR light. Further, the third pattern 700 can be displayed at the same time as the first and second patterns 810, 820, or can also be displayed alternately (in a time-sharing manner) with the first and second patterns 810, 820.

By using such a third pattern 700, it is possible to accurately distinguish between the case in which the fingertip F1 is in the contact state and the case of the state in which the phase wrapping occurs. Specifically, in the case of the contact state, the third pattern 700 is not projected on the fingertip F1. Therefore, as shown in FIG. 14, the stereo-rectified image P31 at this moment becomes in the state in which the continuity of the third pattern 700 is maintained except in the address [N+1]. Further, since the third pattern 700 is not projected on the fingertip F1, the third pattern 700 does not overlap the first pattern 810 and the second pattern 820 on the fingertip F1, and thus, it is possible to recognize the first and second patterns 810, 820 on the fingertip F1 as an image. In contrast, in the case in which the phase wrapping occurs, the third pattern 700 is projected on the fingertip F1, and thus, apart shadowed by the fingertip F1 occurs somewhere in the third pattern 700. Therefore, as shown in FIG. 15, the shadowed part 710 occurs in the third pattern 700 and thus, the stereo-rectified image P31 at this moment becomes in a discontinuous state. Further, since the third pattern 700 is projected on the fingertip F1, the third pattern 700 overlaps the first and second patterns 810, 820 on the fingertip F1, and thus, it is becomes difficult to recognize the first and second patterns 810, 820 on the fingertip F1 as an image.

From such a difference between the images, it is possible to accurately distinguish between the contact state and the state in which the phase wrapping occurs. Therefore, the touch recognition higher in accuracy becomes possible. Further, since the phase wrapping can effectively be suppressed as described above, it is possible to shorten the pitches of the first and second patterns 810, 820, and thus, the touch recognition higher in accuracy becomes possible. Further, in the stereo-rectified image P31, since the third pattern 700 extends in a horizontal direction, analysis of the image becomes easy.

According also to such a third embodiment as described hereinabove, substantially the same advantages as in the first embodiment described above can be exerted.

Fourth Embodiment

Then, an image recognition unit according to a fourth embodiment of the invention will be described.

Figure 16:
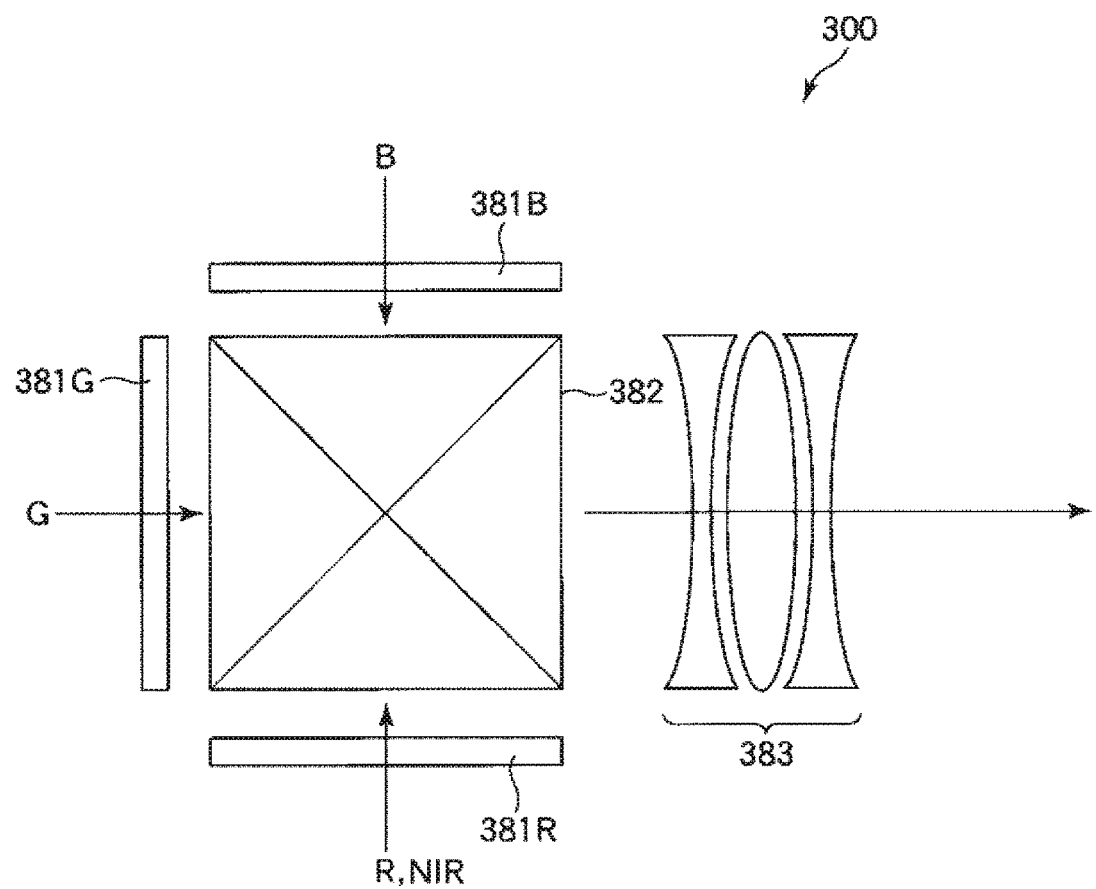
FIG. 16 is a configuration diagram of a projector used in an image recognition unit according to a fourth embodiment of the invention.
Figure 17:
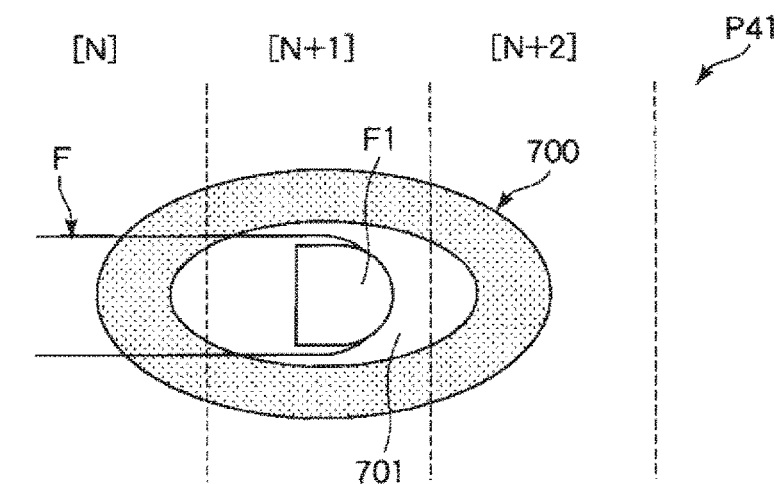
FIG. 17 is a diagram for explaining a method of the touch recognition.
Figure 18:
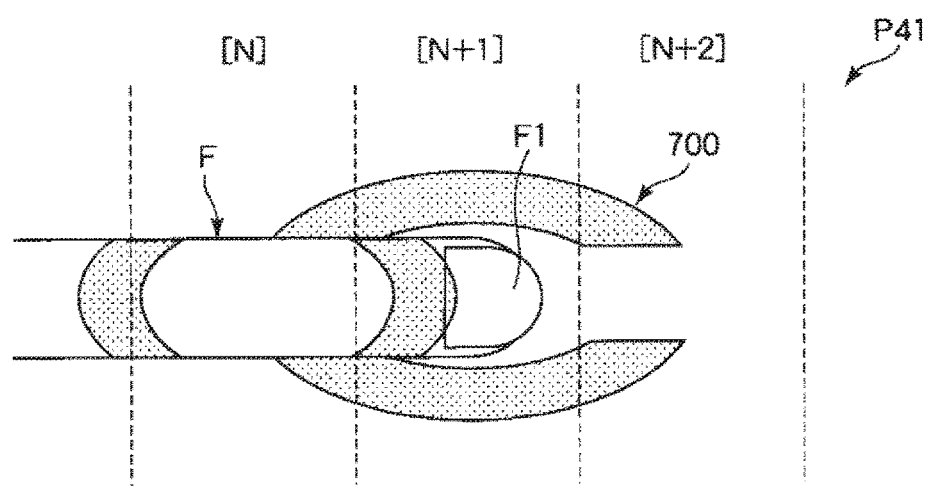
FIG. 18 is a diagram for explaining the method of the touch recognition.
Figure 19:
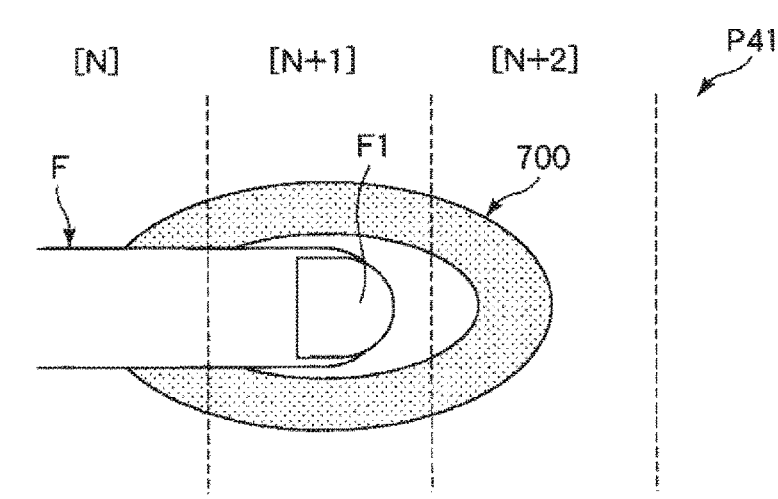
FIG. 19 is a diagram for explaining the method of the touch recognition.

FIG. 16 is a configuration diagram of a projector used in the image recognition unit according to the fourth embodiment of the invention. FIG. 17 through FIG. 19 are each a diagram for explaining a method of the touch recognition.

Hereinafter, the image recognition unit according to the fourth embodiment of the invention will be described wherein the description will be presented with a focus mainly on the differences from the embodiment described above, and the description regarding substantially the same matters will be omitted.

The image recognition unit according to the fourth embodiment is substantially the same as the first embodiment described above except the point that the configuration of the projector (a detecting image display device) is different. It should be noted that the constituents substantially the same as those of the embodiment described above are denoted by the same reference symbols.

The projector 300 of the present embodiment is substantially the same as the projector 200 (see FIG. 2), and is provided with liquid crystal display elements 381R, 381G, 381B, a dichroic prism 382, and a projection lens system 383 as shown in FIG. 16. A difference from the projector 200 is the point that it is arranged that the NIR light enters the liquid crystal display element 381R together with the red light R. Since the red light R is smaller in wavelength difference from the NIR light compared to the green light G and the blue light B, it is possible to realize the same optical system with relative ease. According to the projector 300 having such a configuration, it is possible to project the first and second patterns 810, 820 generated using the visible light and the third pattern 700 generated using the NIR light at the same time with a relatively simple configuration.

Here, if the third pattern 700 is projected with the NIR light using the projector 300 described above, the third pattern 700 is recognized as a red color (since the red light R is also modulated together with the NIR light). Therefore, there is a possibility that the image on the screen 900 is damaged by the third pattern 700. Therefore, in order to prevent the image on the screen 900 from being damaged, in the present embodiment, as shown in FIG. 17, the third pattern 700 is improved in design to have a circular ring shape (ring shape) looking like a pointer. Further, the third pattern 700 is displayed so as to straddle the three cycles of the address pattern AD (specifically, the address [N+1] in which the fingertip F1 is located, and the addresses [N], [N+2] adjacent on both sides to the address [N+1]). Further, an internal space 701 of the third pattern 700 is located so as to stride over the address [N+1] in which the fingertip F1 is located.

Also by using such a third pattern 700, it is possible to accurately distinguish between the case in which the fingertip F1 is in the contact state and the case of the state in which the phase wrapping occurs. For example, as shown in FIG. 17, the stereo-rectified image P41 in the case of the contact state becomes in the state in which the third pattern 700 is also projected on the finger F, and the third pattern 700 is displayed throughout the entire circumference to form the ring shape. In contrast, in the case in which the phase wrapping of one cycle occurs, the third pattern 700 is projected on the finger F, and thus, the part shadowed by the finger F occurs in the third pattern 700. Therefore, as shown in FIG. 18, the stereo-rectified image P41 at this moment becomes in the state in which apart of the third pattern 700 is reflected as a shadow. Further, in the case in which the phase wrapping no smaller than two cycles occurs, the third pattern 700 is projected on a reverse side (screen 900 side) of the finger F. Therefore, as shown in FIG. 19, the stereo-rectified image P41 at this moment becomes in the state in which a part of the third pattern 700 is reflected so as to be shadowed by the finger F.

From such a difference between the images, it is possible to accurately distinguish between the contact state and the state in which the phase wrapping has occurred. Therefore, the touch recognition higher in accuracy becomes possible. Further, in the present embodiment, since the third pattern 700 is recognized as red, the third pattern 700 does not become remarkably bright, and can exert high contrast with the surroundings. Therefore, the touch recognition higher in accuracy becomes possible.

It should be noted that in order to more accurately detect the case in which the phase wrapping no smaller than two cycles occurs, it is preferable to arrange that the first and second patterns 810, 820 are not displayed when obtaining the image of the third pattern 700 by, for example, blinking the first and second patterns 810, 820 with a predetermined period.

According also to such a fourth embodiment as described hereinabove, substantially the same advantages as in the first embodiment described above can be exerted.

Fifth Embodiment

Then, an image recognition unit according to a fifth embodiment of the invention will be described.

Figure 20:
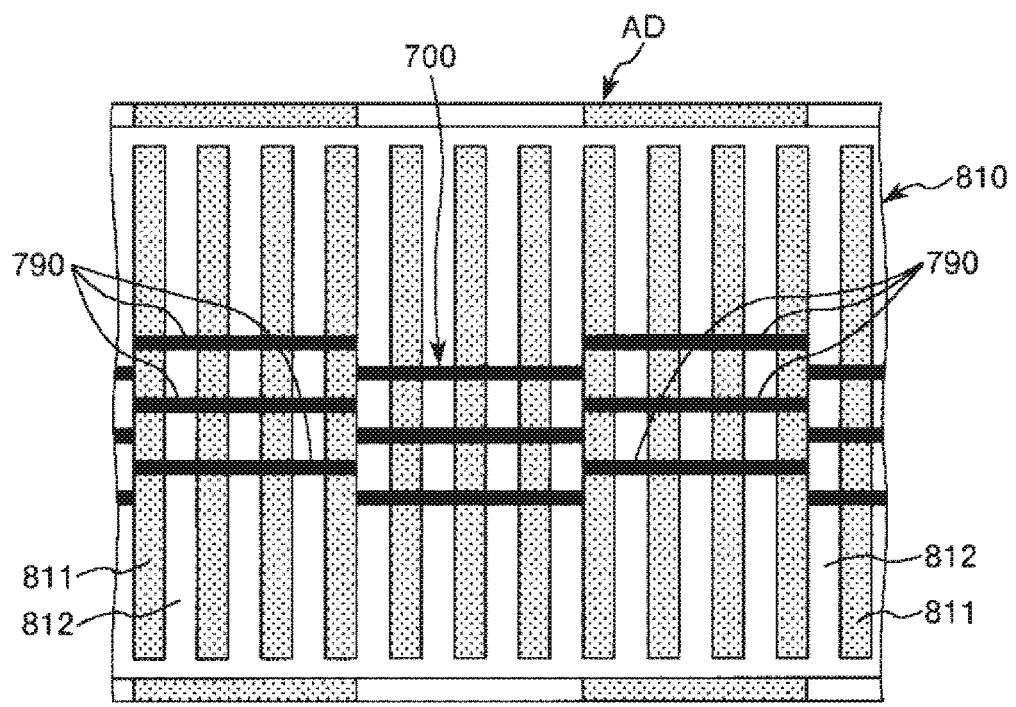
FIG. 20 is a diagram showing a detecting pattern used in an image recognition unit according to a fifth embodiment of the invention.
Figure 20:
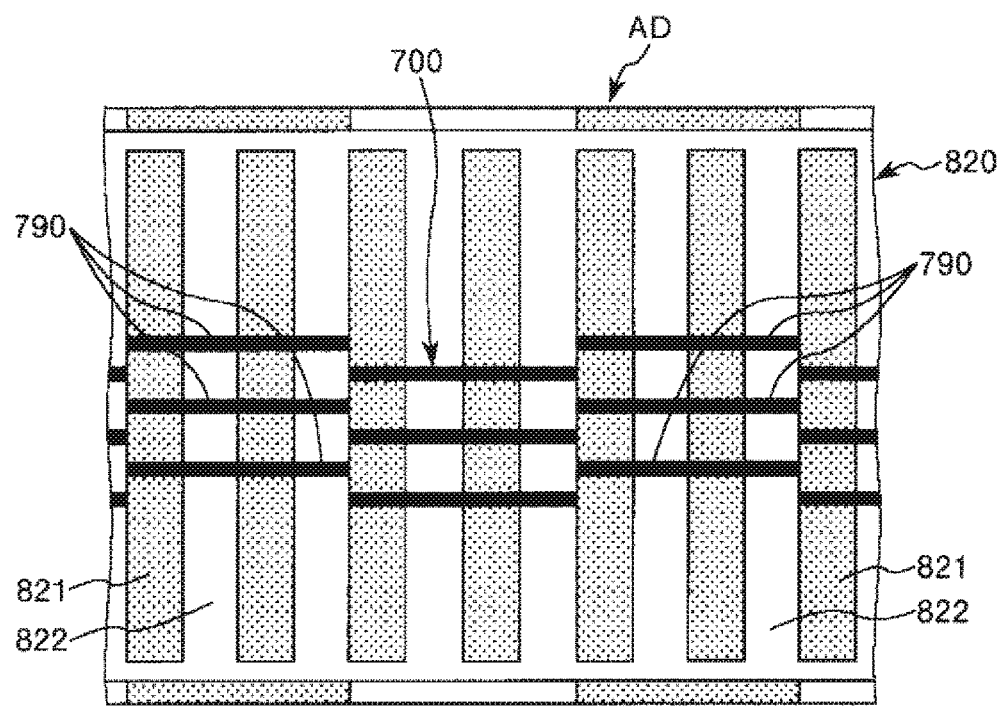
Figure 21:
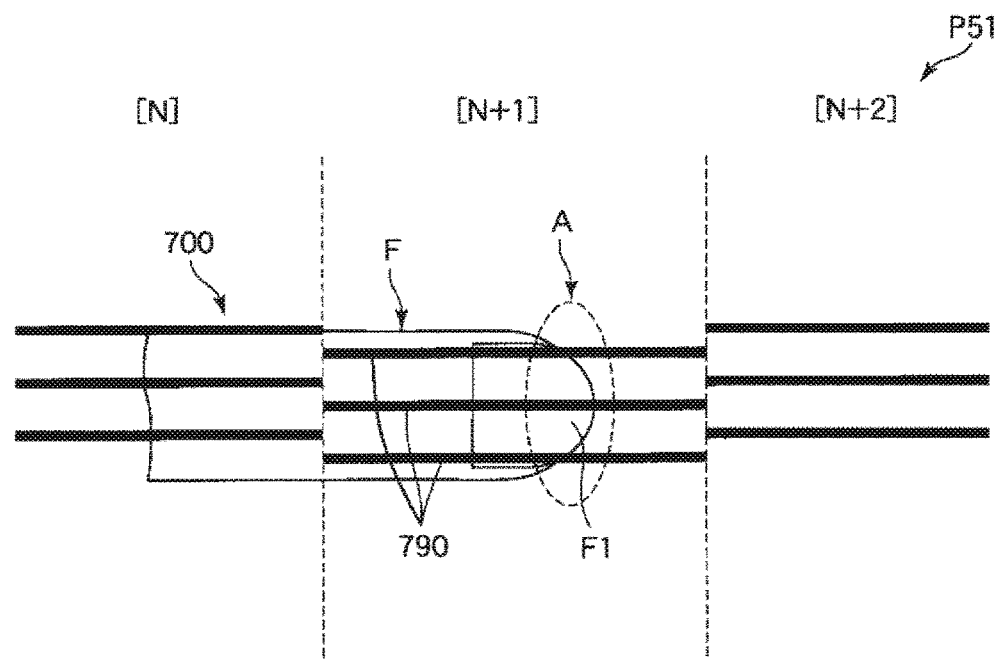
FIG. 21 is a diagram for explaining a method of the touch recognition.
Figure 22:
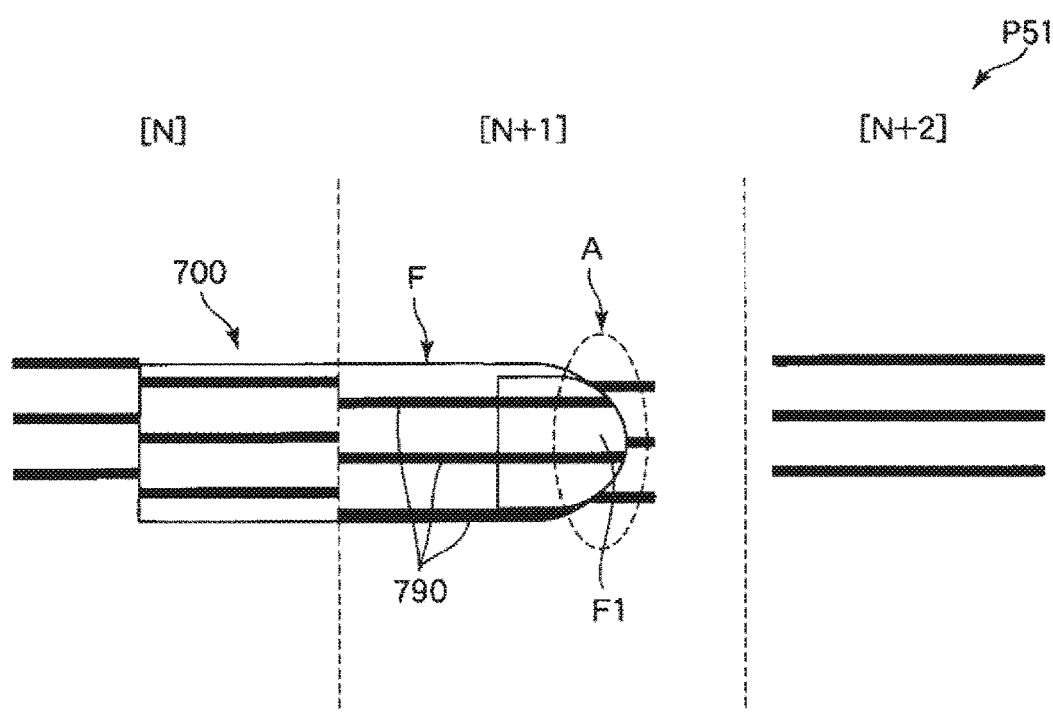
FIG. 22 is a diagram for explaining the method of the touch recognition.

FIG. 20 is a diagram showing a detecting pattern used in the image recognition unit according to the fifth embodiment of the invention. FIG. 21 and FIG. 22 are each a diagram for explaining a method of the touch recognition.

Hereinafter, the image recognition unit according to the fifth embodiment of the invention will be described wherein the description will be presented with a focus mainly on the differences from the embodiment described above, and the explanation regarding substantially the same matters will be omitted.

The image recognition unit according to the fifth embodiment is substantially the same as the third embodiment described above except the point that the configuration of the detecting pattern is different. It should be noted that the constituents substantially the same as those of the embodiment described above are denoted by the same reference symbols.

As shown in FIG. 20, in the present embodiment, the third pattern 700 is projected in addition to the first and second patterns 810, 820 as the detecting pattern. The third pattern 700 has linear patterns 790 each shaped like a straight line along a direction parallel to the epipolar line EL, and the plurality of (three in the present embodiment) linear patterns 790 is displayed so as to be separated in a vertical direction (a direction crossing the epipolar line EL). Further, between the addresses adjacent to each other, each of the linear patterns 790 is shifted in the vertical direction (i.e., becomes discontinuous between the regions). It should be noted that the third pattern 700 can be generated using the visible light, or can also be generated using the NIR light.

Also by using such a third pattern 700, it is possible to accurately distinguish between the case in which the fingertip F1 is in the contact state and the case of the state in which the phase wrapping occurs. For example, in the stereo-rectified image P51 in the case of the contact state, as shown in FIG. 21, the linear patterns 790 have continuity in the boundary part A between the fingertip F1 and the screen 900. Further, since the fingertip F1 has contact with the screen 900, the shadow caused by the fingertip F1 does not occur on the third pattern 700. In contrast, in the stereo-rectified image P51 in the case in which the phase wrapping occurs, as shown in FIG. 22, the linear patterns 790 are shifted in the vertical direction in the boundary part A, or a shadow occurs to cause discontinuity.

From such a difference between the images, it is possible to accurately distinguish between the contact state and the state in which the phase wrapping occurs. Therefore, the touch recognition higher in accuracy becomes possible.

It should be noted that in order to more accurately detect the case in which the phase wrapping no smaller than two cycles occurs, it is preferable to arrange that the first and second patterns 810, 820 are not displayed when obtaining the image of the third pattern 700 by, for example, blinking the first and second patterns 810, 820 with a predetermined period.

According also to such a fifth embodiment as described hereinabove, substantially the same advantages as in the first embodiment described above can be exerted.

Although the image recognition device, the image recognition method and the image recognition unit according to the invention are hereinabove described based on the embodiments shown in the drawings, the invention is not limited to these embodiments. For example, in the image recognition device according to the invention, the configuration of each of the constituents can be replaced with an arbitrary configuration having substantially the same function, and further, it is also possible to add other arbitrary constituents. Further, it is also possible to arbitrarily combine any of the embodiments described above with each other.

REFERENCE SIGNS LIST

100 image recognition unit
200 projector
240B, 240G, 240R liquid crystal display element
250 dichroic prism
260 projection lens system
300 projector
310 light source
311B, 311G, 311R light source
312B, 312G, 312R collimator lens
313 light combining section
313a, 313b, 313c dichroic mirror
314 collecting lens
320 scanning section
330 movable section
331 mirror
341, 342 shaft section
350 drive frame section
361, 362 shaft section
370 support section
381B, 381G, 381R liquid crystal display element
382 dichroic prism
383 projection lens system
400 camera
410 light receiving unit
411 lens system
412 imaging element
500 image recognition device
510 pattern display section
520 measurement point determination section
530 position detection section
600 projector
700 third pattern
701 internal space
710 shadowed part
790 linear pattern
810 first pattern
811 first region
812 second region
820 second pattern
821 first region
822 second region
900 screen A boundary part
AD address pattern
B blue light
C1 camera center
C2 angle alteration center
EL, EL' epipolar line
F finger
F1 fingertip
G green light
J1, J2 axis
l1, l2, l3 straight line
LL illumination light
LL1 first illumination light
LL2 second illumination light
La picture light
Lb modulated light
P11 first image
P12 second image
P31, P41, P51 stereo-rectified image
Pe epipolar point
R red light
SH shadow
T1 first pitch (width)
T2 second pitch (width)
T3 third pitch
x coordinate
Σ epipolar plane
π1 image plane
π2 virtual image plane

The invention claimed is:

1. An image recognition device used in an image display unit including an imaging device adapted to image an image display surface, and a detecting image display device adapted to display a pattern for detection on the image display surface, the image recognition device comprising:
 a pattern display section adapted to make the detecting image display device display a first pattern in which bright lines crossing an epipolar line determined from a positional relationship between the imaging device and the detecting image display device are arranged with a first pitch, and a second pattern in which bright lines crossing the epipolar line are arranged with a second pitch different from the first pitch at respective time points different from each other;
 a measurement point determination section adapted to detect an object located between the imaging device and the image display surface to determine a measurement target point of the object; and
 a position detection section adapted to detect a position of the measurement target point with respect to the image display surface based on a first image including the measurement target point and the first pattern and a second image including the measurement target point and the second pattern obtained by the imaging device, wherein
 the first pattern and the second pattern are not displayed simultaneously,
 the position detection section detects that the object is not contacting the image display surface in response to (i) a first depth position of the object, in the first image including the measurement target point and the first pattern, coinciding with a depth position of the image display surface and (ii) a second depth position of the object, in the second image including the measurement target point and the second pattern, not coinciding with the depth position of the image display surface, and
 the position detection section detects that the object is contacting the image display surface in response to (i) the first depth position of the object, in the first image including the measurement target point and the first pattern, coinciding with the depth position of the image display surface and (ii) the second depth position of the object, in the second image including the measurement target point and the second pattern, coinciding with the depth position of the image display surface.

2. The image recognition device according to claim 1, wherein
 the second pitch is shorter than twice the first pitch.

3. The image recognition device according to claim 1, wherein
 the first pattern and the second pattern are each divided into a plurality of regions having a third pitch along an arrangement direction of the bright lines, and an address used to identify a position is assigned to each of the plurality of regions.

4. The image recognition device according to claim 3, wherein
 the third pitch is equal to a lowest common multiple of the first pitch and the second pitch.

5. The image recognition device according to claim 3, wherein
 the pattern display section makes the detecting image display device display a third pattern having a linear shape along the epipolar line passing through the measurement target point except the region in which the measurement target point is located.

6. The image recognition device according to claim 3, wherein
 the pattern display section makes the detecting image display device display a third pattern straddling the region in which the measurement target point is located and two regions adjacent to the region in which the measurement target point is located.

7. The image recognition device according to claim 3, wherein
 the pattern display section makes the detecting image display device display a third pattern having a linear pattern along a direction parallel to the epipolar line, and the linear pattern is disposed in the plurality of regions adjacent to each other so as to be shifted from each other in a direction crossing the epipolar line.

8. An image recognition unit comprising:
 the image recognition device according to claim 1;
 the imaging device; and
 the detecting image display device.

9. The image recognition unit according to claim 8 comprising:
 an image display device adapted to display an image on the image display surface.

10. The image recognition device according to claim 1, wherein
 the position detection section detects the position of the measurement target point with respect to the image display surface based on a comparison between a first position of the object in the first image including the measurement target point and the first pattern, a second position of the object in the second image including the measurement target point and the second pattern, and a position of the image display surface.

11. An image recognition method used in an image display unit including an imaging device adapted to image an image display surface, and a detecting image display device adapted to display a detecting image on the image display surface, the image recognition method comprising:
- a pattern display step adapted to make the detecting image display device display a first pattern in which bright lines crossing an epipolar line determined from a positional relationship between the imaging device and the detecting image display device are arranged with a first pitch, and a second pattern in which bright lines crossing the epipolar line are arranged with a second pitch different from the first pitch at respective time points different from each other;
- a measurement point determination step adapted to detect an object located between the imaging device and the image display surface to determine a measurement target point of the object; and
- a position detection step adapted to detect a position of the measurement target point with respect to the image display surface based on a first image including the measurement target point and the first pattern and a second image including the measurement target point and the second pattern obtained by the imaging device, wherein the first pattern and the second pattern are not displayed simultaneously, the position detection step detects that the object is not contacting the image display surface in response to (i) a first depth position of the object, in the first image including the measurement target point and the first pattern, coinciding with a depth position of the image display surface and (ii) a second depth position of the object, in the second image including the measurement target point and the second pattern, not coinciding with the depth position of the image display surface, and the position detection step detects that the object is contacting the image display surface in response to (i) the first depth position of the object, in the first image including the measurement target point and the first pattern, coinciding with the depth position of the image display surface and (ii) the second depth position of the object, in the second image including the measurement target point and the second pattern, coinciding with the depth position of the image display surface.

12. The image recognition method according to claim 11, wherein the position detection step detects the position of the measurement target point with respect to the image display surface based on a comparison between a first position of the object in the first image including the measurement target point and the first pattern, a second position of the object in the second image including the measurement target point and the second pattern, and a position of the image display surface.

* * * * *